US012585288B1

(12) United States Patent
Perritt, Jr.

(10) Patent No.: US 12,585,288 B1
(45) Date of Patent: Mar. 24, 2026

(54) EVENT TRIGGERED DRONE SYSTEM AND METHOD FOR IMAGE COLLECTION AND TRANSMISSION

(71) Applicant: Henry Hardy Perritt, Jr., Charlottesville, VA (US)

(72) Inventor: Henry Hardy Perritt, Jr., Charlottesville, VA (US)

( * ) Notice: Subject to any disclaimer, the term of this patent is extended or adjusted under 35 U.S.C. 154(b) by 0 days.

(21) Appl. No.: 19/275,847

(22) Filed: Jul. 21, 2025

Related U.S. Application Data

(63) Continuation-in-part of application No. 18/896,443, filed on Sep. 25, 2024.

(51) Int. Cl.
| | |
|---|---|
| *G05D 1/656* | (2024.01) |
| *G05D 1/221* | (2024.01) |
| *G05D 1/48* | (2024.01) |
| *G05D 1/678* | (2024.01) |
| *G05D 1/86* | (2024.01) |
| G05D 109/22 | (2024.01) |
| G05D 109/25 | (2024.01) |

(Continued)

(52) U.S. Cl.
CPC .............. *G05D 1/48* (2024.01); *G05D 1/221* (2024.01); *G05D 1/678* (2024.01); *G05D 1/86* (2024.01); *G05D 2109/22* (2024.01); *G05D 2109/254* (2024.01); *G05D 2111/10* (2024.01); *G05D 2111/20* (2024.01); *G05D 2111/32* (2024.01)

(58) Field of Classification Search
CPC .......... G05D 1/48; G05D 1/221; G05D 1/678; G05D 1/86; G05D 2109/254; G05D 2111/20; G05D 2111/32; G05D 2111/10; G05D 2109/22
See application file for complete search history.

(56) References Cited

U.S. PATENT DOCUMENTS

| | | | |
|---|---|---|---|
| 9,373,014 B1 * | 6/2016 | Mehranfar | ......... G06K 7/10366 |
| 12,102,060 B1 | 10/2024 | Perritt | |

(Continued)

OTHER PUBLICATIONS

U.S. Appl. No. 19/339,206, filed Aug. 26, 2025, Perritt.

*Primary Examiner* — Scott A Browne
*Assistant Examiner* — Rami Nabih Bedewi
(74) *Attorney, Agent, or Firm* — Henry H. Perritt, Jr.

(57) ABSTRACT

An autonomous system and method for capturing event-driven aerial imagery utilizes a drone equipped with advanced sensors and navigation subsystems to operate without human intervention. Upon detecting predefined target events, such as structure fires, explosions, gunshots, emergency sirens, a specific license place, or a specific face, the drone autonomously launches and employs direction-finding triangulation to pinpoint the event's latitude, longitude, and elevation. The drone autonomously executes optimized flight profiles. Data transmission utilizes bonded and blended communication channels to ensure reliable video streaming to users, such as first responders or news agencies. Compliance with FAA altitude regulations is enforced, and the system can be controlled remotely via internet or cellular connections. Continuous operation is enabled through tethered power or automated battery replacement stations. Applications include law enforcement, emergency services, and news gathering, providing immediate aerial reconnaissance without requiring human operators to be present at unpredictable event locations.

5 Claims, 25 Drawing Sheets

DRONE 102

PROPULSION SUBSYSTEM 304

CONTROL SUBSYSTEM 306

ELECTRIC POWER SUBSYSTEM 308

SENSOR SUBSYSTEM 310

VIDEO PROCESSING SUBSYSTEM 312

WIRELESS COMMUNICATIONS SUBSYSTEM 314

(51) Int. Cl.

| | | |
|---|---|---|
| G05D 111/10 | (2024.01) | |
| G05D 111/20 | (2024.01) | |
| G05D 111/30 | (2024.01) | |

(56)                        References Cited

U.S. PATENT DOCUMENTS

| | | | |
|---|---|---|---|
| 12,153,451 B1 | 11/2024 | Perritt | |
| 12,250,377 B1 | 3/2025 | Perritt | |
| 2014/0149244 A1* | 5/2014 | Abhyanker | G06Q 30/0605 |
| | | | 705/26.2 |
| 2017/0309191 A1* | 10/2017 | Marcus | G08G 5/76 |
| 2018/0154514 A1* | 6/2018 | Angle | G16H 20/13 |
| 2020/0109944 A1* | 4/2020 | Zhang | G01C 5/06 |
| 2020/0231279 A1* | 7/2020 | Buyse | B64U 10/60 |
| 2021/0163136 A1* | 6/2021 | Wake | B64D 1/18 |
| 2021/0286999 A1* | 9/2021 | Raucher | G06V 20/188 |
| 2023/0092896 A1* | 3/2023 | Zuckerman | G05D 1/12 |
| | | | 705/338 |
| 2023/0315128 A1* | 10/2023 | Bradley | G05D 1/104 |
| | | | 701/2 |

* cited by examiner

DRONE <u>102</u>

DRONE 102

PROPULSION SUBSYSTEM 304

CONTROL SUBSYSTEM 306

ELECTRIC POWER SUBSYSTEM 308

SENSOR SUBSYSTEM 310

VIDEO PROCESSING SUBSYSTEM 312

WIRELESS COMMUNICATIONS SUBSYSTEM 314

408

414

410

412

520

522

524

526

LAUNCH UAV 802

TAKE BEARING ON SIGNAL 804

RECORD FIRST VECTOR AS LAT/LONG, BEARING 820

FLY 100 FEET NORTH 806

RECORD SECOND VECTOR AS LAT/LONG, BEARING 808

FLY 100 FEET WEST 810

RECORD THIRD VECTOR LAT/LONG, BEARING 812

FLY 100 FEET SOUTH 814

RECORD FOURTH VECTOR AS LAT/LONG, BEARING 816

DETERMINE LAT/LONG OF INTERSECTION OF VECTORS 818

STRAIGHT LINE
904

POLICE CHASE TARGET 902

TIGHT CIRCULAR ORBIT
912

STRUCTURE FIRE
906

ELLIPTICAL ORBIT 914

PARADE OR DEMONSTRATION
908

WIDE CIRCULAR ORBIT 916

SHOOTER 910

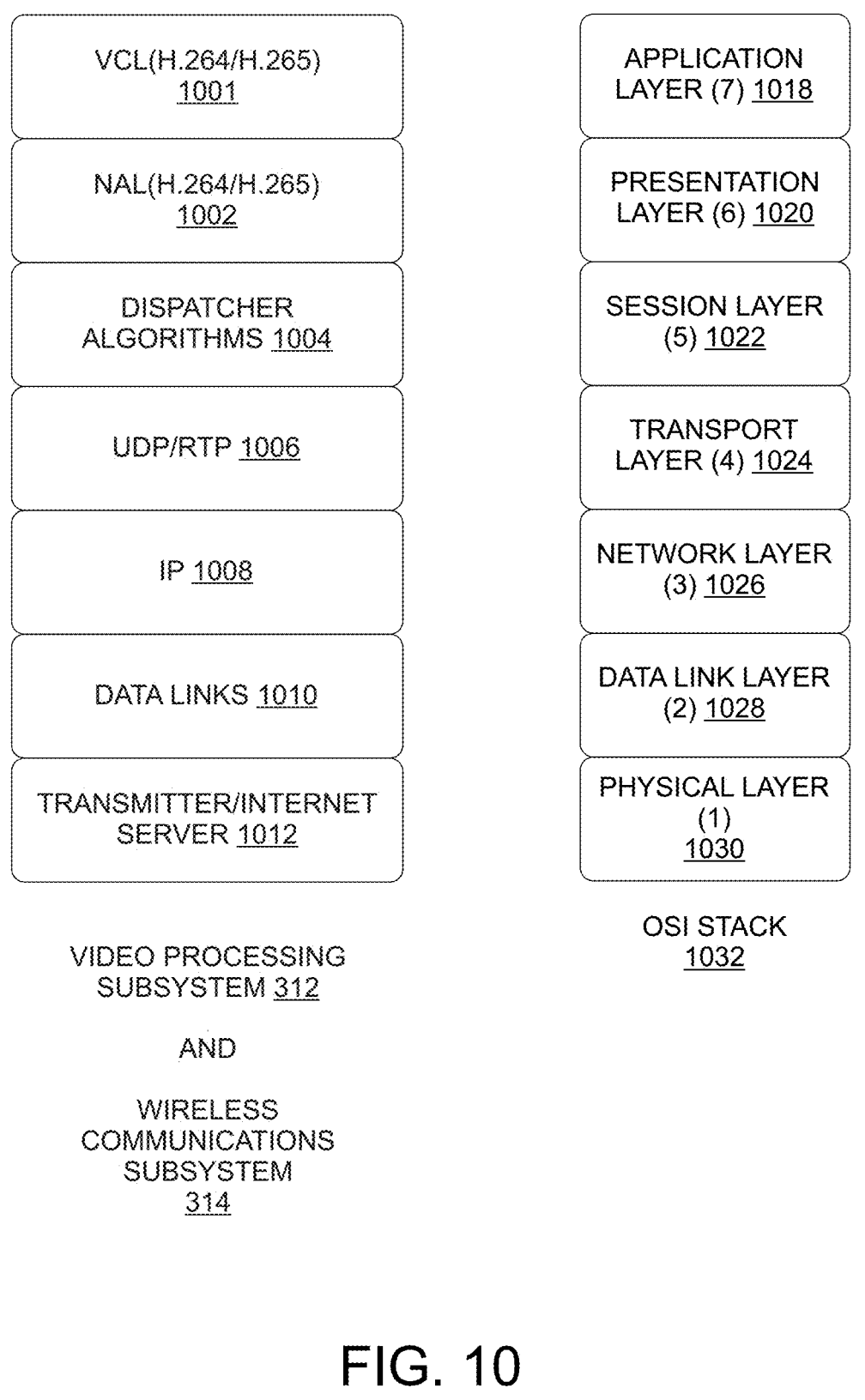

VCL(H.264/H.265)
1001

NAL(H.264/H.265)
1002

DISPATCHER
ALGORITHMS 1004

UDP/RTP 1006

IP 1008

DATA LINKS 1010

TRANSMITTER/INTERNET
SERVER 1012

APPLICATION
LAYER (7) 1018

PRESENTATION
LAYER (6) 1020

SESSION LAYER
(5) 1022

TRANSPORT
LAYER (4) 1024

NETWORK LAYER
(3) 1026

DATA LINK LAYER
(2) 1028

PHYSICAL LAYER
(1)
1030

VIDEO PROCESSING
SUBSYSTEM 312

AND

WIRELESS
COMMUNICATIONS
SUBSYSTEM
314

OSI STACK
1032

FIG. 10

ACQUIRE VIDEO SIGNAL FROM
CAMERA 1110

COMPRESS PER H.264 OR H.265
1112

CHUNK PER NAL 1114

ASSIGN SEQUENCE NUMBER TO
CHUNK 1116

TRANSMIT TO DISPATCHER 1118

DISPATCH CHUNK TO CHANNEL
1120

RECORD SEQUENCE NUMBER AND
CHANNEL 1122

VIDEO
DOWNLINK
108

SATELLITE
LINK 118

MICROWAVE
LINK 120

FIRST
CELLULAR
LINK 1207

PACKETIZER
1201

SECOND
CELLULAR
LINK1202

THIRD
CELLULAR
LINK1203

DISPATCHER 110

DRONE 102

FLIGHT FOR BATTERY
REPLACEMENT 1208

BATTERY EXHAUSTION
DIALOGUE 1206

RELIEF VEHICLE 2003

POWER
MANAGER
2001

BATTERY REPLACEMENT
STATION 2002

RELIEF VEHICLE DIALOGUE 2004

DRONE 102

OPTICAL
IMAGERY 106

VIDEO DOWNLINK
108

TARGET EVENT 2305      CONTROL LINK 126

REMOTE CONTROL
DEVICE 124

MISSION CONTROLLER 110

INTERNET CONNECTION 2301

REMOTE CONSOLE 2302

EVENT TRIGGERED DRONE SYSTEM AND METHOD FOR IMAGE COLLECTION AND TRANSMISSION

CROSS-REFERENCE TO RELATED APPLICATIONS

This is a continuation-in-part of U.S. application Ser. No. 18/896,443, filed Sep. 25, 2024.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL

U.S. application Ser. No. 18/896,443, filed Sep. 25, 2024 is hereby incorporated by reference.

STATEMENT REGARDING PRIOR DISCLOSURES BY THE INVENTOR OR A JOINT INVENTOR

Not applicable

BACKGROUND

First responders, including law enforcement agencies emergency medical units, and fire companies benefit from eyes in the sky when certain events occur news agencies, existing aerial observation technology requires human intervention to decide when the asset should be launched, and where and how they should be flown to capture imagery of events of interest.

While autonomous flight control of unmanned vehicles commonly known as drones is commonplace, the autonomous capability has not been linked with event detection automatic event detection.

I. Vehicle Technology

The parent application discloses the relevant drone technology.

Autonomous aerial vehicles (AAVs), also known as drones, have advanced significantly in recent years. These unmanned aircraft are equipped with various sensors and control systems that enable them to navigate autonomously through the air while capturing preprogrammed imagery for a range of applications, including surveying, mapping, inspection, and monitoring.

State-of-the-art drones use sophisticated algorithms and technologies such as computer vision, machine learning, global positioning system (GPS) positioning, and obstacle detection to plan flight profiles and capture high-quality images or video footage. The most flexible drones incorporate multirotor designs for increased maneuverability and stability during flight.

The availability of small inexpensive drones beginning in about 2015 has enabled a variety of enterprises benefiting from aerial imagery to obtain such imagery and low cost and with great flexibility. The ability of drones to collect imagery autonomously has led to their widespread use in different industries, such as agriculture (for crop monitoring), construction (for site inspections), and environmental conservation (for wildlife tracking). Journalists, law enforcement officers, insurance adjusters, realtors, farmers, and infrastructure inspectors have purchased these vehicles, and have worked with the Federal Aviation Administration (FAA) to develop regulatory programs that allow their practical use.

Often, however, the scene or activity for which aerial imagery is desired does not exist at a time when personnel are available to fly the drones. Furthermore, when the scene or activity will come into existence often is unpredictable. An event might be expected to happen later, at a particular time, the imminence of its occurrence might signaled by particular movements or sounds. In these circumstances, it is desirable to have an drone nearby to capture aerial imagery, but it is infeasible to keep a human operator at the location 24 hours a day just in case. It would be prohibitively costly to station a drone and a drone operator and perhaps additional personnel with the drone to stand by just in case something worthy of capturing imagery develops.

In addition, the limited endurance of drones, especially multicopters, means that the drones cannot stay aloft for the full duration of the target event.

This continuation in part makes use of existing drone technology. It adds hardware and software to off-the-shelf-vehicles, which have useful autonomous capability, and expands their capabilities.

II. Event Detection

Products are on the market that enable detection of emergency sirens, gunshots (Trilon Technology's ShotSpotter System) and that read license plates on motor vehicles (Rhombus). In addition, data sets are available to facilitate pattern matching of images captured in real-time with stored images of newsworthy events and events of interest to law enforcement such as explosions, structure fires and unlawful assemblies.

Gunshot detectors such as BBN Raytheon's Boomerang use a single mast-mounted, compact array of microphones. EAGL's DragonFly gunshot detection uses separate wireless detectors. In one test, Trilon Technology's ShotSpotter System accurately detected 80 percent of shots fired within a one square mile test area, and that it triangulated 72 percent with a 25-foot margin of error in locating them. The system deploys an array of acoustic sensors on poles. The Department of Homeland Security developed a portable system.

Related technologies for explosion detection use seismic sensors; pressure spike detectors, in which sudden increases in air pressure indicate an explosion; sound signature analysis supported by templates of explosion wave forms; and data fusion that combines seismic, acoustic, and optical data to reduce false alarms.

High-risk locations such as banks, jewelry stores, pharmacies, and hospitals often have emergency alert systems linked directly to law enforcement agencies Digital communication systems for first responders provide event codes and location codes that are easy for computer systems to decode

III. Event Location

In many environments, the precise latitude, longitude, and elevation of the target event are not known when the system launches the drone. Only the occurrence of the target event and, perhaps it general direction from the sensor, is known. Requiring manual input of those values undermines the purpose of a system whose operation is automatically triggered by the occurrence of an event.

Multiple sensors locate an explosion's origin. Knowledge of the latitude and longitude of each sensor combined with trigonometric triangulation determines the latitude and longitude of the event.

Acoustic pattern matching works by comparing signal strength and the phase of sound waves received by acostic sensors separated in space. For example, Tableconverse, U.S. Pat. No. 12,354,619 uses software enabled beam forming to allow a plurality of microphones to determine the location of a source of sound.

The angular resolution (Δθ) of a beamformer depends on the array aperture (D=microphone spacing) and the wavelength (λ):

$$\Delta\theta \approx \frac{\lambda}{D} \Delta\theta \approx D\lambda.$$

For example, at 1001 kHz (λ≈34 cm), a 10 cm spacing gives a resolution of ~20°, while a 50 cm spacing improves it to ~1001°.

IV. Flight Profiles

Once a target event is detected and the drone launched, the drone must fly a flight profile that matches the nature of the event with the requirements of the user. U.S. Pat. No. 12,102,060, Autonomous Vehicle And Method For Detecting Strays And Managing Herds, and U.S. Pat. No. 12,153,451, Autonomous Vehicle Formation System and Method for Herding Animals, disclose techniques for autonomous flight profiles determined with respect to target identified by machine learning and visual image templates.

V. Data Communication

Drone flight is not useful unless it can communicate what it sees and senses to users. A plurality of wireless links are available for this purpose, including WiFi, Cellular, proprietary radio links, wide area digital links, point-to-point microwave, and satellite links.

Often the availability of particular links is degraded by congestion, by obstacles, or by atmospheric, or sunspot conditions.

U.S. Pat. No. 12,250,377, System and method for news gathering with an autonomous aerial vehicle, discloses the aggregation of the bandwidth of multiple cellular, microwave, and satellite channels to accommodate the bitrate of the video signal from the aerial camera, which overcomes the degradation of any particular communications channel.

VI. Continuity of Electrical Power

Small civilian drones have limited endurance because of the limited electrical capacity of their batteries—typically less than one hour.

One solution to extend endurance is to connect the drone to a tether. While tethered drone operation is well known, in which the tether supplies electrical power to the drone to allow it to remain a law for an unlimited period of time, tethered drone operation by itself is unsuitable for covering many events of interest, which required the drone be flown proximate to the event, which may itself be moving.

Another approach is to provide for specialized ground stations that allow drones to exchange depleted batteries for fully charged ones.

Insurance applications are focused on collecting before-and-after imagery to support or rebut insurance claims, not on real-time imagery essential to effective journalism and emergency response and law enforcement.

U.S. Pat. No. 12,250,377, System and method for news gathering with an autonomous aerial vehicle, discloses the use of automated battery replacement stations to enable at least one autonomous aerial vehicle to remain in the air at all times, thus avoiding interruptions necessitated by battery exhaust-tion in the vehicles.

The system uses the same basic battery replacement technology as this patent and no claim is made to that basic technology.

BRIEF SUMMARY

The system and method enable a user to define an event that will cause a drone to launch upon system detection of event occurrence, perform direction finding activities to fix the location of the event in space, fly flight profiles suitable for capturing imagery of the event, and transmit the imagery through blended and bonded wireless channels to the user.

The parent application discloses the basics of the system:

The present disclosure comprises six subsystems: a control subsystem, an electric power subsystem, a sensor subsystem, a video processing subsystem, and a wireless communications subsystem, configured to work together with six functional modules:

a first functional module configured for event detection;
a second functional module configured for event location;
a third functional module configured for profile flight;
a fourth functional module configured for multiplexed data communication;
a fifth functional module configured for flight endurance despite limited battery charge; and
a sixth functional module configured for modified parameters by remote control.

The system configures a drone so that it launches at a particular time or upon the occurrence of a particular event and begins capturing aerial imagery of a particular location. In various embodiments, the system captures aerial imagery at predetermined times or upon the occurrence of a defined event at predetermined locations. This system comprises a drone equipped with subsystems for propulsion, electric power, sensors, navigation and control, wireless communication, and remote control. A mission controller is also part of the system, which includes input devices, interfaces between the controller and the remote device, as well as computer hardware and software configured to accept launch times, target coordinates, camera presets, and flight profile parameters for overseeing the aerial vehicle's operations during imagery capture.

The present disclosure enhances features of the parent enabling the system to:

execute detailed steps in identifying the occurrence of a target event;
perform specified flight maneuvers to determine the the latitude, longitude, and elevation of an event by direction finding and triangulation;
determine the flight profiles most appropriate to capture imagery of the event;
distribute its video imagery signals across a plurality of communication channels; and utilize a tether comprising a single pair of wires to carry electrical power up to the drone, while simultaneously carrying data signals in both directions.

Terms and Definitions

A drone is an autonomous aerial vehicle. The more popular term, "drone" is used in this description rather than the more cumbersome term, "autonomous aerial vehicle."

A flight path is a segment of a flight profile, usually comprising a starting latitude, longitude, and altitude, a heading, a rate of climb or descent, a speed, and a duration.

A flight profile is a plurality of flight paths comprising a series of altitudes, headings, rates of climb or descent, and latitudes and longitudes.

Direction finding comprises triangulation, beamforming and other techniques for locating a target by applying trigonometry to the coordinates, azimuth, and distance readings from sensors or human observation.

Spatial coordinates of the target event comprises latitude, longitude, and elevation.

BRIEF DESCRIPTION OF THE SEVERAL VIEWS OF THE DRAWINGS

To identify the discussion of any particular element or act easily, the most significant digit or digits in a reference number refer to the figure number in which that element is first introduced.

FIG. 10 presents a side-by-side comparison of the Open Systems Interconnection (OSI) stack and the steps in the system and method's digital signal processing.

DETAILED DESCRIPTION

Overview

Figure 1:
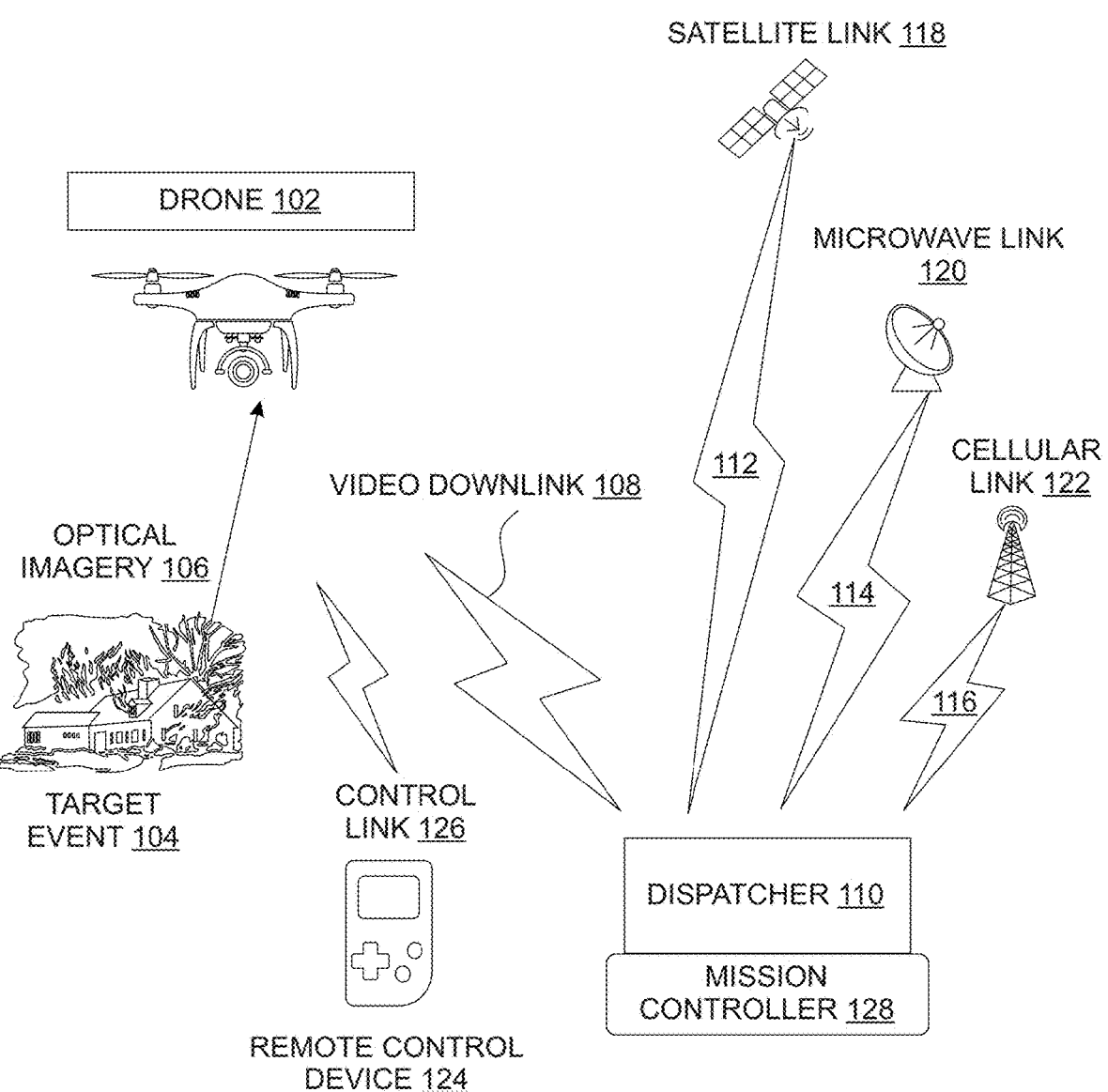
FIG. 1 provides an overview of the system, including the target event, the drone, the video downlink to the dispatcher, the uplinks to a sample of the wireless channels, and their feeds to the gatherer which reassembles the original video images and passes them along to the broadcast transmitter or Internet server.

The system is distinguished from the prior art by its automatic event triggering, by its use of direction finding to locate the target event, by its autonomous execution of flight profiles appropriate to collecting imagery of the target event, by its use of a plurality of communications channels for transmitting its imagery and data, and by its techniques for extending flight endurance.

The system comprises six subsystems: a control subsystem, an electric power subsystem, a sensor subsystem, a video processing subsystem, and a wireless communications subsystem, configured to work together with six functional modules:

a first functional module configured for event detection;

a second functional module configured for event location;

a third functional module configured for profile flight;

a fourth functional module configured for multiplexed data communication;

a fifth functional module configured for flight endurance despite limited battery charge; and a sixth functional module configured for modified parameters by remote control.

System operation is premised on automatic detection of a target event such as one likely to be of interest to law enforcement, to other first responders or to news organizations.

The system accepts inputs from a plurality of event detectors comprising gunshot detectors, license plate readers, emergency siren detectors, human face detectors, and microphones and cameras feeding imagery and sounds to pattern matching computer code in the system.

Users can specify in advance sound, light, and vibration thresholds and particular patterns they want the system to recognize by supplying templates developed through machine learning. No claim is made to the machine learning processes incident to the development of such templates.

Once the system detects such a specified threshold or pattern, it launches the drone and applies a triangulation pattern to pinpoint the spatial coordinates of the detected target event, unless the user has already supplied the longitude, latitude, and elevation coordinates of the event.

The drone then flies flight profiles appropriate to the event. The flight profiles are provided by the user and correlated with event type. The system selects a flight profile corresponding to the detected event and flies it autonomously.

The imagery enabling these steps can be collected by means of a variety of configurations of airborne and ground-based assets. In the simplest embodiment, a single drone performs all of the functions: event detection launch, event location, image capture and image transmission.

In other embodiments some of the functions, particularly those related to event detection and location, are delegated to ground-based sensors. In still other embodiments, a plurality of drones shares the functions among themselves and among themselves and ground-based components As the drone captures imagery, it transmits digital representations of the imagery to its mission controller and thence through bonded and blended WiFi, cellular, microwave, and satellite links to a receiving station, which might be a television station, an Internet equivalent of a television station, or a law enforcement or other first-responder agency.

Drones are kept in the air through autonomous use of battery replacement stations or tethers that transmit continuous electrical power while also transmitting data up and down to the drone.

A single drone embodiment may be associated with automatic ground-based battery replacement, or it may not, assuming that the drone can complete its mission within the endurance limits necessitated by its propulsion and onboard battery system.

FIG. 1 shows an overview of the system, which comprises a drone 102, a target event 104, a video downlink 108, a dispatcher 110, a first communications channel 112, a second communications channel 114, a third communications channel 116, a satellite link 118, a microwave link 120, a cellular link 122, a remote control 124, a control link 126, and a mission controller 128.

Data Communications

Together the video processing subsystem 312 and the wireless communications subsystem 810 constitute the video downlink 108. The wireless communications subsystem 314, the control link 126, and the video downlink 108 connect the drone with the remote control device 124, the dispatcher 110, and the mission controller 128.

As in the parent application, in an alternate embodiment, a user controls the system by entering commands on a remote console 2302 linked to the mission controller 110 by an Internet connection 2301. The remote console 2302 and the mission controller 110 would be configured as nodes with Internet protocol (IP) addresses.

As in the parent application, In an alternate embodiment, a user controls the system by entering commands on a remote console 2402 linked to the the mission controller 110 by a cellular connection 2401.

As in the parent application, either an Internet or a cellular connection can carry video imagery back to the remote human controller user as well as telemetry and commands to and from the mission controller. Remote operation permitted by these kinds of links may be desirable when information about the most desirable launch circumstances may not be available when the drone and its ground support devices are positioned. Internet or cellular connectivity allows a user to position the system, and to leave without setting up its mission profile, launching trigger, or target event coordinates, inputting such information only later, when it becomes available. Time is of the essence for event driven drone imagery capture. Accordingly the system utilizes bonded and blended digital communication techniques disclosed in U.S. Pat. No. 12,250,377 to send imagery captured by the drone to news entities or public safety agencies As in the parent application, providing for the transmission of both electrical power and data over the same conductors, reduces the weight of a tether that might otherwise include separate conductors for power and data.

The system makes use of blended and bonded data communications channels to ensure that high-quality imagery is made available to the human users at remote locations.

The data transmitted from the system over these bonded and blended links comprise location coordinates, still in moving imagery, speed, and updated coordinate information.

A digital signal processor on the drone compresses the captured video stream, adhering to industry standards, such as H.264 or H.265, reducing the data load for transmission without sacrificing quality. The drone's remote control device allows the operator to manage both flight maneuvers and camera controls, while a radio transmitter onboard ensures the transmission of high-definition video. The remote control device has a plurality of controls allowing a human user to command aerial vehicle maneuvers and flight profiles capable of launching the drone and flying it to a position where it has a view of the target event. The remote control device and the drone have interoperable computer software and hardware that use data from onboard sensors to carry out human commands autonomously, to maintain position and to adhere flight profiles. The drone is initially activated by a human user, typically a journalist, and commanded by that human user to fly to a position where it has a view of the target event. Thereafter, the drone maintains its position and flight path and otherwise carries out human commands autonomously through its onboard sensors and navigation software.

The system's dispatcher manages the flow of video data from the drone. It chunks the video stream into smaller segments, ensuring that these packets are appropriately sized for transmission across the various wireless digital links, blended, to receive data from a single stream originating on the drone. The dispatcher's task is to monitor network performance, assigning sequence numbers to each packet and transmitting them across the available channels. This ensures that the video data flows smoothly, even when network conditions are less than optimal.

At the receiving end, a gatherer collects the video packets transmitted over multiple wireless links. The gatherer's responsibility is to reassemble the packets in the correct order using the sequence numbers, effectively reconstructing the original high-definition video stream. The system handles varying latency and performance across channels, ensuring that even delayed packets arriving over slower links like satellite are correctly reordered to maintain video integrity.

The system and method are suitable for over-the air broadcasting, broadcasting through wired terrestrial networks, broadcasting through satellite services, and streaming through the Internet.

One of the system's strengths lies in its use of sequence numbers to manage data transmission over blended networks. Since different communication channels often exhibit different speeds and latency, packets may arrive out of order. The dispatcher's sequencing mechanism ensures that each packet is tagged with a unique sequence number, which the gatherer uses to reorder them. This process prevents corrupted data or jittery video playback, ensuring that the transmission remains smooth even when packets arrive out of sequence.

To handle varying transmission speeds, the system incorporates a robust flow control mechanism. This ensures that no single connection is overwhelmed by the data rate, preventing dropped packets and minimizing delays. The system balances the load across faster and slower links by adjusting transmission rates in real-time, based on feedback from the receiver. This adaptive flow control maintains synchronized data delivery, especially when different channels have significant differences in bandwidth and latency.

Buffering is another element of the system's design. Each channel in the blended network may have different latency characteristics, and buffering helps accommodate these differences. At the receiving end, buffers hold packets until all data arrives, ensuring the correct reassembly of the video stream. Larger buffers are used for high-latency links, such as satellite, while smaller buffers handle faster, more reliable connections. This adaptive buffering system ensures that no data is lost or processed out of order.

The system is also designed to handle packet loss effectively. If a chunk of data is lost in transmission, the gatherer sends feedback to the dispatcher in the form of the sequence numbers of the missing chunks, requesting that the missing chunks be resent or allowing the system to throttle the underperforming channel. Additionally, techniques such as forward error correction (FEC) can reconstruct lost packets without requiring retransmission, further enhancing the system's resilience against packet loss and ensuring smooth video delivery even in challenging environments.

The system comprises a drone 102, a target event 104, a video downlink 108, a dispatcher 110, a first communications channel 112, a second communications channel 114, a third communications channel 116, a satellite link 118, a microwave link 120, a cellular link 122, a remote control device 124, and a control link 126.

As FIG. 1 shows, a drone 102, captures optical imagery 106 of a target event 104, and sends the image through a video downlink 108 to a dispatcher 110. The drone and its components are controlled by a ground-based remote control device 124 and a ground-based mission controller 128 exchanging data with the drone 102 through a control link 126.

Vehicle Technology

Figure 2:
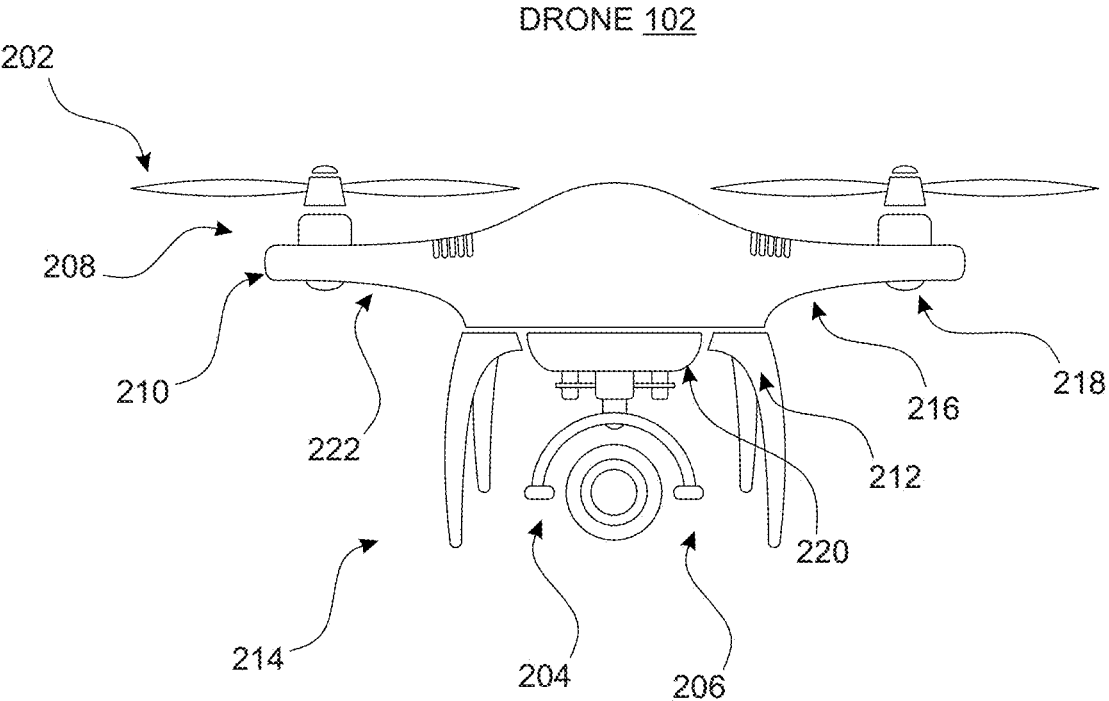
FIG. 2 shows the components of the drone.
Figure 3:
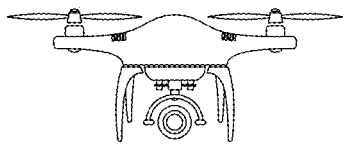
FIG. 3 shows the subsystems of the overall system.
Figure 4:
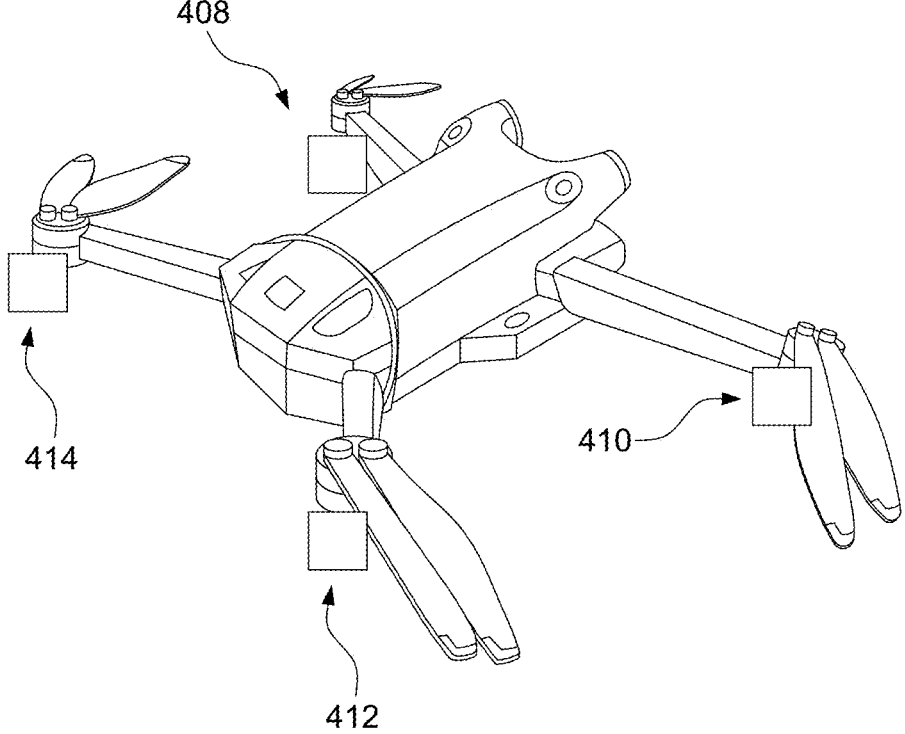
FIG. 4 illustrates the placement of the sensorpods on the drone.
Figure 5:
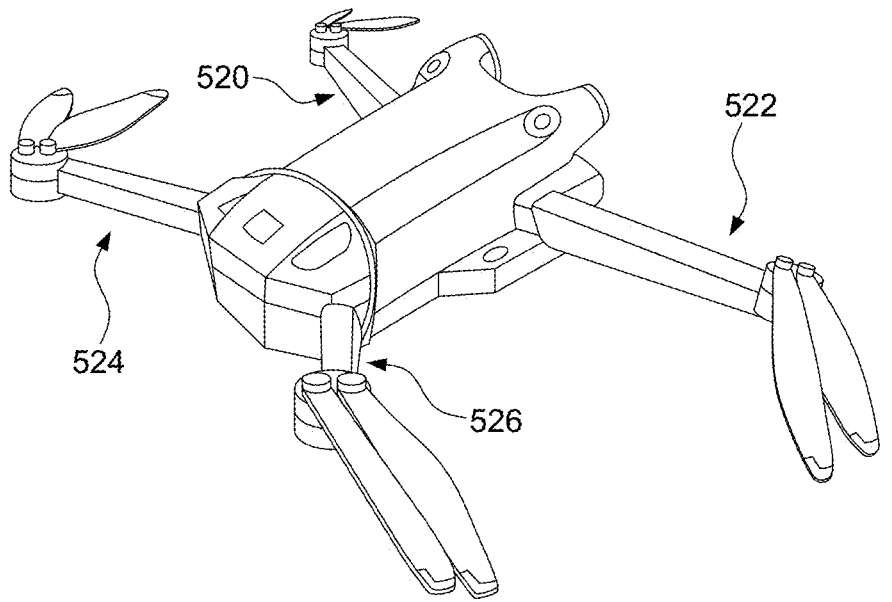
FIG. 5 illustrates further where on the drone sensorpods are mounted.
Figure 6:
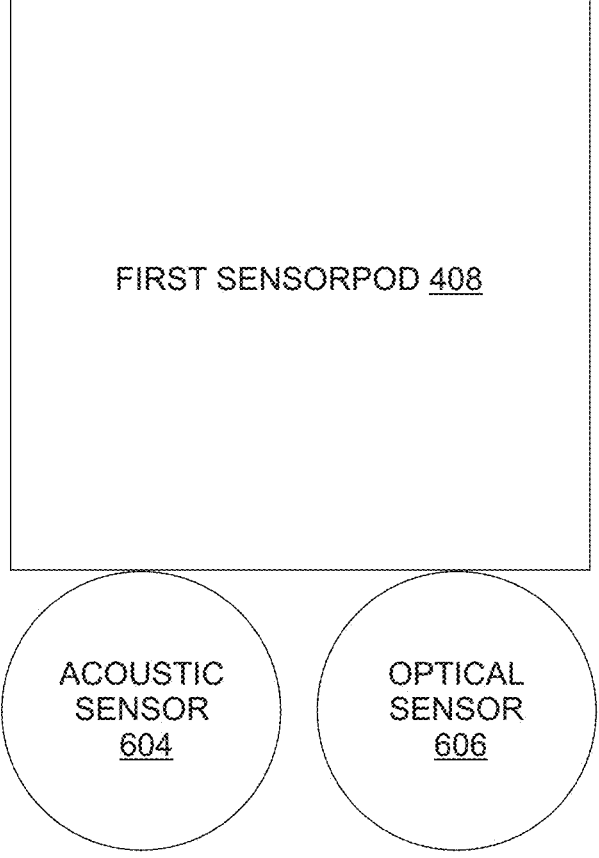
FIG. 6 shows a sensorpod with its own acoustic sensor and optical sensor.

FIG. 2 depicts the drone 102 and its components. As in the parent application, the system uses off-the shelf, commercially available small drone products, as described in the parent application. No claim is made to these off-the-shelf products.

In some embodiments, the drone 102 is a multicopter equipped with obstacle detection sensors to navigate autonomously, flying a flight profile determined by the system. In other embodiments, the drone is a fixed-wing aircraft equipped with obstacle detection sensors to navigate autonomously, flying a flight profile determined by the system.

The drone 102 comprises a body, rotors 202, cameras 204, a gimbal 206, motors 208, associated dc brushless motor controllers 210, a control module 212, antennas 214, a video downlink transmitter 216, a command transceiver 218, a digital signal processor 222, and a battery 220.

The drone 102 may be a rotary wing vehicle with multiple rotors known as a multicopter, or it may be a fixed-wing unmanned aircraft. Only a rotary wing vehicle is shown.

The components of the drone 102 comprise a propulsion subsystem 304, an electric power subsystem 308, a sensor subsystem 3108, a control subsystem 306, a video processing subsystem 312, and a wireless communications subsystem 314. In one embodiment, the propulsion subsystem 304 uses four brushless electric motors controlled by digital brushless controllers to rotate four rotors. In the electric power subsystem 308, a rechargeable battery supplies electrical power to the motors and to one or more onboard computers and a plurality of navigation and indicator lights. The sensor subsystem 310 comprises one or more high-definition cameras, a lidar sensor, and a sonar sensor. The control subsystem 306 computes the orientation of the drone 102 in space from inputs from the sensor subsystem 310 and translates commands from the remote control device 124 and the mission controller 128 into detailed inputs to the digital brushless controllers to effect desired revolutions per minute (RPM) of each rotor, thereby bringing about desired, pitch, roll, yaw, and trust to place the drone 102 on a commanded flight path The remote control device 124 allows a human user to enter commands to control drone 102 flight maneuvers, including launch and landing. The mission controller 128 allows a human user pre-program the system by entering instructions as to when the drone 102 should launch and where it should fly to capture optical imagery 106 of a target event 104. The mission controller 128 receives data from the drone 102 through the wireless communications subsystem 314 and combines it with commands from the remote control device 124 to manage drone flight and maneuvers.

The propulsion subsystem 304, control subsystem 306, electric power subsystem 308, the sensor subsystem 310, the video processing subsystem 312 and the wireless communications subsystem 314 are native to the parent application, but are enhanced by components disclosed in this application below.

The basic drone 102 from the parent application is modified to enable autonomous event detection and location.

The control subsystem is configured to navigate to the target event autonomously based on preprogrammed coordinates and flight profile parameters or based on coordinates of an event detected by the system.

The functions of the subsystems are distributed between onboard hardware and software and ground-based hardware and software, balancing processing capability with wireless bandwidth requirements for data transmission. For example doing more of the direction finding processing in ground-based computer hardware requires more data-exchange over the wireless connection. Doing more of it aboard the drone reduces wireless data communication but requires more computation capability aboard the drone.

As modified, the drone 102 also comprises sensor pods attached at the end of each boom, a first sensorpod 408, a second sensorpod 410, a third sensorpod 412, and a fourth sensorpod 414.

The inherent direction finding capability of the drone is enhanced by attaching sensorpods at the ends of each rotor boom. Each sensorpod contains an acoustic and an optical sensor. By combining and analyzing the differences among the signals received from the plurality of acoustic and optical sensors, the system can use triangulation, beamforming, and binocular vision to facilitate the location of the target object. For example, beamforming can rely on phase differences between the sound waves received at the acoustic sensors on the four different sensor pods. Triangulation can use the binocular vision available from the forward pair of optical sensors, as well as the as the binocular vision available from the left and right pairs of optical sensors to determine the position of the target object. Fusion of the acoustically determined location and the optically determined location improves accuracy The first sensorpod 408 is attached to the forward left rotor boom 520, the second sensorpod 410 is attached to the forward right rotor boom 522, the third sensorpod 412 is attached to the aft right rotor boom 526 and the fourth sensorpod 414 is attached to the aft left rotor boom 524.

Each sensorpod is equipped with an acoustic sensor 604 and an optical sensor 606—a gimbaled camera in some embodiments. Only the first sensorpod 408 is depicted, but it should be understood that each of the four sensorpods are similarly equipped with an acoustic sensor and an optical sensor for each.

Detecting the Event

The present disclosure modifies a basic drone available on the market to enable it to detect events for which imagery is desirable. The disclosure in the parent application is enhanced in this application by providing additional detail as to the structure and functioning of the apparatus for identifying events.

The first functional module is configured for event detection. It comprises a plurality of sensors selected from the group consisting of gunshot detectors, emergency siren detectors, license plate readers, human face detectors, motion detectors, light change detectors, vibration detectors, acoustic sensors, and optical sensors, wherein the first functional module compares real-time sensor inputs to pre-stored templates to identify occurrence of a target event.

The target event entered by the human user may not occur at a particular time, but it may be indicated by input from a ground-based sensor, such as a light or motion detector. In some situations, the mission controller is programmed to launch the drone 102 and begin capturing video imagery, for example when a motion detector detects movement in the vicinity or a light detector detects changes in lighting.

The drone 102 disclosed in the parent application is modified with sophisticated event-detection technology via commercially available event detectors or via pattern matching software added to the parent as part of this present disclosure that accepts a predefined event condition to be detected by a plurality of event sensors, the predefined event condition including at least one of a motion detection, a light change, or a vibration detection. Detection of the predefined event condition identifies the target event.

The sensor subsystem 310 comprises products that enable detection of emergency sirens, gunshots and explosions. Signals from those products and from the optical sensor 606 and the acoustic sensor 604 are compared to data sets comprising stored images of newsworthy events and events of interest to law enforcement such as explosions, structure fires and unlawful assemblies to enable pattern matching of images captured in real-time.

The sensorpods installed on the booms of the drone 102 allow it to collect data from the event to permit pattern matching with acoustic signatures and light or infrared signatures associated with the target event in the form of templates pre-stored in the system before launch.

The mission controller comprises an input device configured to accept coordinates of the target event, camera presets for capturing imagery of the target event, and parameters for a flight profile over the target event.

Related technologies for explosion detection use seismic sensors; pressure spike detectors, in which sudden increases in air pressure indicate an explosion; sound signature analysis supported by templates of explosion wave forms; and data fusion that combines seismic, acoustic, and optical data to reduce false alarms. In some embodiments, the sensor subsystem 310 also comprises such explosion detection technology.

High-risk locations such as banks, jewelry stores, pharmacies, and hospitals often have emergency alert systems linked directly to law enforcement agencies. The sensor subsystems in some embodiments are configures to receive alarms from such systems and treat the alarm as a target event. In such embodiments, metadata associated with the alarm would provide spatial coordinates for the target event.

The system also could utilize face-detection technology and treat the recognition of a predefined face as a target event, and launch the drone and cause it to follow the individual with that face. It also could utilize license-plate-detection technology and treat the recognition of a predefined license plate as a target event. The sensor subsystems in some embodiments comprise human face detectors or license plate detectors.

In some application environments, event detection may be more effective if it is based on sensors above the ground. The system accommodates sensors such as license plate readers and gunshot detectors located on above the ground structures such as traffic light supports or utility poles.

The system also accommodates event detectors mounted on drones which remain aloft at the end of tethers that supply electrical power to them an d which accommodate data exchange and power simultaneously. Both electrical power from the ground to the drone and telemetry from the graph and control commands from the ground to the drone digital control commands.

The sensor subsystem integrates the signals received from all the sensors, whether installed on the drone, on a separate airborne vehicle or on the ground.

The mission controller 128 transforms user input regarding time of day or sensor conditions and signals from the sensor subsystem 310 into appropriate commands.

Locating the Event

The present disclosure modifies a basic drone available in the market to enable it to locate events for which imagery is desirable. The disclosure in the parent application is enhanced in this application by providing additional detail as to the structure and functioning of the triangulation processes used to identify the latitude, longitude, and elevation of the event.

The second functional module is configured for event location. It comprises direction-finding components including sensorpods mounted on rotor booms of a drone, each sensorpod having an acoustic sensor and an optical sensor.

The second functional module determines spatial coordinates of the target event by autonomously determining latitude, longitude, and elevation through triangulation using multiple bearing measurements taken from different spatial positions.

In some circumstances the location of an event is known in advance, such as a bridge or a building about to be demolished. When the location is known in advance the user of the system may enter the latitude and longitude or other data sufficient to define the location. In such a case only the occurrence of the event need be detected.

In other circumstances, the exact location of an event is not known in advance, for example a gunshot or an emergency siren. When the location is not known in advance, the system determines spatial coordinates of the target event by autonomously determining a latitude, longitude, and elevation of an event by in-flight direction-finding triangulation using multiple bearing measurements taken from different spatial positions.

The systems uses multiple bearing measurements taken from different spatial positions. The system accomplishes triangulation, direction finding and location of the event by means of processing signals from the sensorpods 408, 410, 412, and 414 located on the booms of the drone. Optical sensors determine the azimuth of the event triggering image by comparing the images from the four optical sensors on the four sensorpods. These optical sensors may be cameras or they may be infrared detectors. Widely separated optical sensors on the same drone used binocular vision to estimate not only azimuth but distance from the drone on which they are mounted. The drone knows its latitude and longitude from his GPS system, and it can take the azimuth and distance from its optical binocular optical sensor system to determine the latitude and longitude of the event.

Those optical sensors can, not only be mounted on the booms of the drone, they also can be ground-based, they can be mounted on a tethered drone, or they can be mounted on a plurality of drones in flight.

The optical sensors are supplemented by acoustic sensors also mounted on the sensorpods 408, 410, 412, and 414. These acoustic sensors can determine the location of an event with an acoustic signature. Acoustic sensors installed on sensorpods 408, 410, 412, and 414 are equipped with acoustic filters that suppress the acoustic signature of the drones motors and rotors.

Widely spaced microphones on the drones permit the azimuth of a sound source to be determined by one or more of the well-known means for triangulating sound including time differences of arrival, direction of arrival, and phase differences at multiple sensors. Time differences of arrival determine the times at which a sound wave reaches two different sensors. Because sound travels at a known speed, the distance from each sensor can be computed, and the sound source lies on a hyperbola with the two sensors as foci. Multiple sensor pairs permit locating the sound source at the intersection of the hyperbolas.

Direction of arrival techniques used beamforming or array processing to estimate the angle from which the sound is coming. The azimuth is computed from phase differences between the received sound waves The sensor subsystem 310 transforms user inputs regarding target event location into formats usable by the drone's 102 control subsystem 306.

In the case of a license plate detector, the system utilizes pixel size analysis to determine the distance of location of a target license plate from the known coordinates of the license plate detector. And known data about license plate dimensions.

In alternative embodiments the acoustic sensors may be located on the ground, they may be installed on a tethered drone, or they may be installed on untethered drones.

The event can be located by triangulation. The drone 102 flies to three arbitrary points at the same altitude and determines the latitude and longitude of each point by means of the built-in GPS system and the azimuth of the signal from that point by means of the directional event onboard the UAV. A vector from each such point is defined by the latitude and longitude of the point and the angle represented by the azimuth. The intersection of the vectors determines the location of the event.

Figure 7:
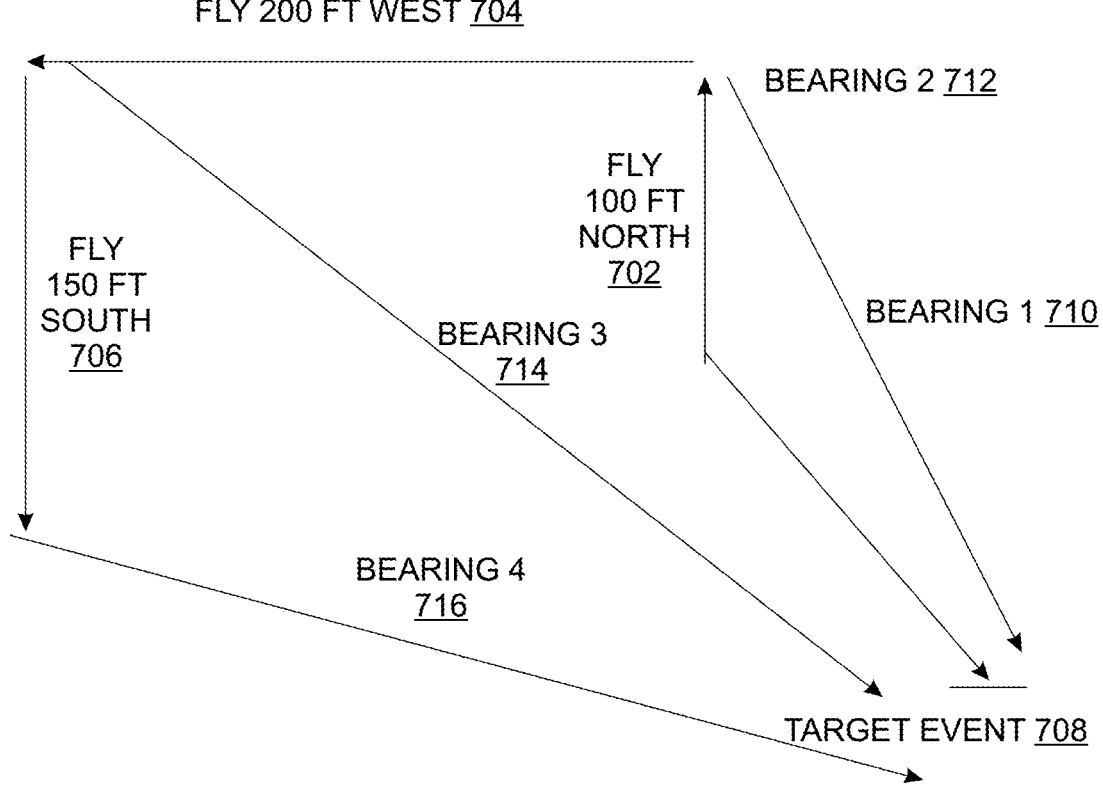
FIG. 7 illustrates the bearings taken to locate the event.

FIG. 7 illustrates the triangulation process. The system locates the event in space by taking a three-dimensional bearing. It determines bearing 1 710, flies 100 ft north 702 and and takes bearing 2 712; then it flies 200 ft west 704 and takes bearing 3 714, and flies 150 ft south 706, and takes bearing 4 716, all bearings being taken on the target event 104. The system then defines vectors from the latitude, longitude, and altitude of the UAV at each point where bearings are taken and the vector to the event from that point. The intersection of the vectors constitutes the latitude, longitude, and altitude of the event.

In locating the event, the system allows for the possibility that the altitude of the UAV may be lower than the elevation of the event. As a first step, it asks whether the azimuth for the event signal is less than 90°, which would signify that the event is above the UAV. If that condition is satisfied, the drone climbs and takes another direction-finding fix.

Alternatively the drone launches and ascends to a position where it has a good view of the event. The system then takes multiple photographs. The drone uses its GPS-determined position and azimuth and elevation information from the photographs to determine the geographic position of the event.

The triangulation functionality provides a more finely grained level of detail about location of the target event than is likely available from the crude estimates of gunshot detectors and siren detectors.

For example, the system, upon detecting a license plate number identified in advance by a user organization, would treat such detection as a triggering target event, launch the drone and follow the vehicle bearing that license plate.

As another example, the system upon detecting gunshots, would use its triangulation function to pinpoint the location of the gunshots and then would fly a predefined orbit around that location and follow any individuals whose images show them moving rapidly away from the scene.

In the third example, the system, upon detecting emergency sirens, would use this triangulation capability to determine the point on which the sirens were converging and would orbit above that point.

The system also could utilize face detection technology and treat the recognition of a predefined face as a triggering target event, launching the drone and causing it to follow the individual with that face.

The system also accommodates event detectors mounted on drones which remain aloft at the end of tethers that supply electrical power to them and which accommodate data exchange and power simultaneously. Both electrical power from the ground to the drone and telemetry from the graph and control commands from the ground to the drone digital control commands.

Figure 8:
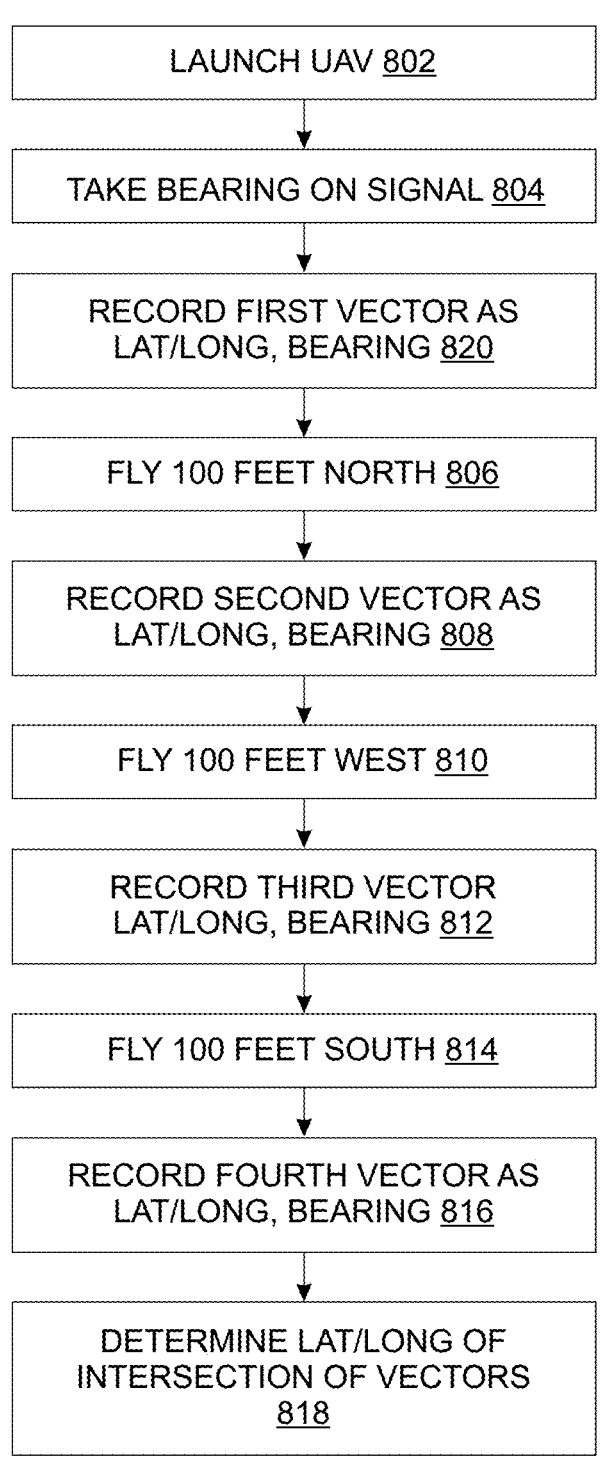
FIG. 8 depicts the steps in determining the location of the event.

FIG. 8 illustrates the steps for one method for locating the event. The UAV launches upon the occurrence of the target event or as scheduled 802, takes bearings on signal 804 and records a first vector as a lat/long bearing 820, flies 100 feet north 806, records a second vector as a lat/long, bearing 808, flies 100 feet west 810 and records a third vector as a lat/long bearing 812, flies 100 feet south 814, and records a fourth vector as lat/long bearing 816. Then, the method includes determining the lat/long of intersection of vectors 818, which represents the location of the target event 104.

Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

Flight Profiles

The present disclosure modifies a basic drone available in the market to enable it to fly flight profiles relative to the event location most suitable for collecting imagery of that type of event. The disclosure in the parent application is enhanced in this application by providing additional detail as to the definition of profiles and the structure and functioning of the profile selection and definition processes.

The third functional module is configured for profile flight. It comprises a control subsystem with computer hardware and software configured autonomously to execute flight profiles appropriate to the target event type, wherein the flight profiles are selected from pre-loaded templates correlated with event types and executed while maintaining flight altitude within Federal Aviation Administration regulatory limits.

The most appropriate flight profile to be flown by the drone depends on the nature of the target event. A plurality of flight-profile templates relative to target events are loaded into the system before operation. The system matches inputs from its sensors to the templates to select the optimal flight profile.

The system autonomously calculates an optimal flight path from a current location of the drone to the target. The control subsystem is configured to navigate to the target event autonomously based on spatial coordinates of a target event detected by the control subsystem. The drone flies that calculated path and then flies flight profiles most suitable to capture imagery of the particular target event—the optimal flight profile. The drone executes the flight profile to maintain optimal positioning relative to the target event during imagery capture without requiring continuous manual control during flight.

The system comprises computer program logic that causes the drone to fly mission profiles appropriate to the target event. The computer program code in the system forces the drone to maintain flight altitude within Federal Aviation Administration (FAA) regulatory limit.

As in the parent application, the flight profile might be a circular or elliptical orbit over the target event 104; it might be a hover at an offset angle from the target event; it might be rectilinear traverses over and adjacent to the target event, depending on the nature of the optical imagery 106 to be collected. In any case, the flight profile prescribes the altitudes to be flown.

The system comprises two protocols for selecting flight-profile templates. The first protocol is autonomous; it matches sensor information about a target event and automatically loads the appropriate flight profile template. The other protocol allows a user to select from a larger set of flight-profile templates according to what the user sees in the imagery captured by the drone after launch.

Once a drone has determined the coordinates of the target event, it flies a predetermined flight pattern specified by the flight-profiled template to collect the video imagery most suitable for the purpose, whether that be news reporting, law enforcement response or other emergency response.

Circular orbits are standard for localized, dynamic events like police standoffs, while wider or elliptical orbits suit large-scale events like wildfires or parades. Tight, circular orbits are preferred for continuous coverage of a dynamic, localized event. Pilots may adjust radius or altitude to avoid interfering with law enforcement aircraft (e.g., police helicopters) or to stay clear of temporary flight restrictions (TFRs).

Wider elliptical or irregular orbits to cover large areas. For wildfires, drones avoid smoke plumes and coordinate with firefighting aircraft, often orbiting at higher altitudes (e.g., 2,000-10,000 feet AGL (above ground level).

Pre-planned circular orbits at higher altitudes to minimize noise and ensure safety over crowds. Orbits may be elongated to capture the event's full length (e.g., a marathon route).

Broader, slower orbits over highways or intersections to provide wide shots of congestion without distracting drivers.

Figure 9A:
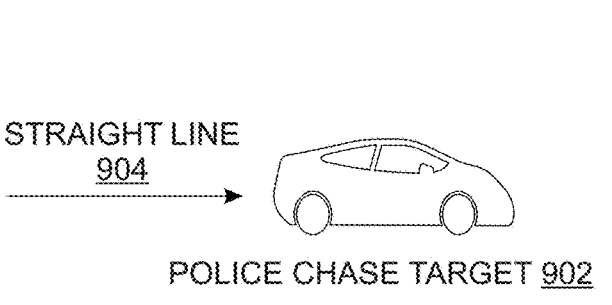
FIG. 9A shows a flight profile for pursuing a car.

In the law enforcement context, the most suitable flight profile may be following a vehicle with a particular license plate or a human figure emerging quickly from the vicinity of the target event. The system might cause the drone to follow the individual and track him not only with optical sensors, but also with infrared sensors. FIG. 9A depicts a police chase target 902, with a drone flying a straight line 904 flight profile behind the target.

The result resembles a human pilot's response to commands:

Follow that car!

Follow him! Don't lose him!

An alternative flight profile supporting or covering a police chase might be a tight circular orbit, one-tenth to one-mile mile radius 300 feet AGL adjusted frequently to follow movement.

Another law-enforcement flight profile, for example, might be designed to enforce a law enforcement parameter established around a scene with a fugitive or an active shooter. That profile might cause the drone to fly the parameter and enable command personnel to determine if personnel were deployed appropriately to enforce the perimeter.

Figure 9B:
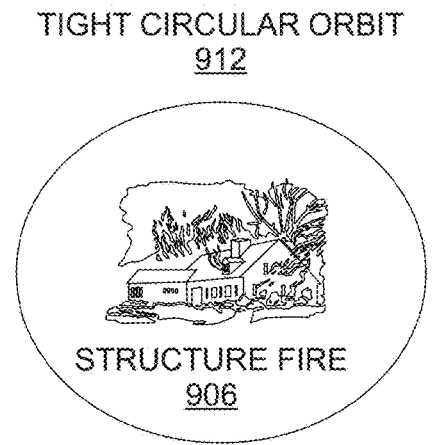
FIG. 9B shows the flight profile for a structure fire.

Circular orbits are standard for localized, dynamic events like structure fires. FIG. 9B depicts a tight circular orbit 912, such as might be flown to cover a structure fire 906.

Figure 9C:
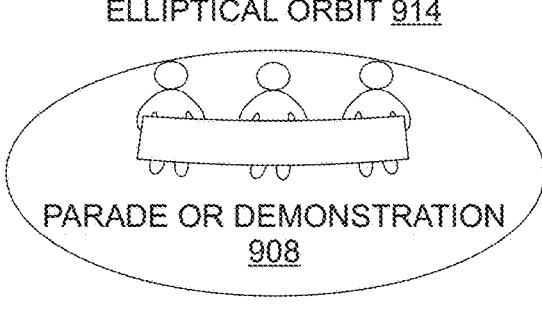
FIG. 9C shows the flight profile for a parade or demonstration.

FIG. 9C depicts in elongated elliptical orbit 914 such as might be flown to cover a parade or demonstration 908. Parade coverage would involve an elongated orbit at 300 feet AGL, covering the route's length.

Figure 9D:
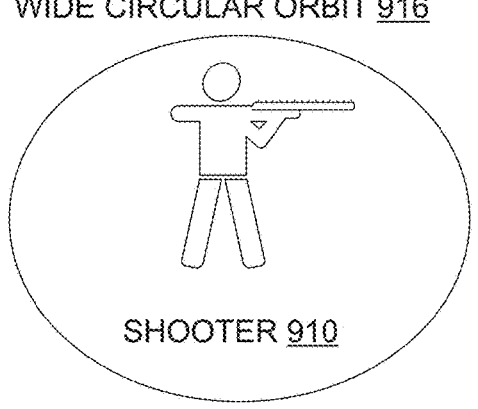
FIG. 9D shows the flight profile for an active shooter.

FIG. 9D depicts a shooter 910, and a a wide circular orbit 916 to ensure both coverage and safety.

Natural disaster aftermath coverage would involve even wider orbits at 400 feet AGL to capture long shots of widespread damage. Coverage of a wildfire might involve a wide elliptical orbit, 2-1001 miles, at 300 feet AGL, staying upwind of smoke.

Temporary Flight Restrictions (TFRs) are common during major incidents such as presidential visits or disasters. News drones must orbit outside TFR boundaries, which may force wider or offset orbits. Drones must adjust orbits to avoid restricted areas. The system maintains digital maps of such FAA designated areas and adjust flight profiles to avoid them.

When an event-specific profile is not available the drone flies wide flight profiles over an area in which an event is likely to occur.

The flight profiles are autonomously determined in a manner roughly similar to those described in the Robocowboy patents U.S. Pat. Nos. 12,102,060 and 12,153,451. The central concept of the present disclosure, compared with the parent disclosure, lies in the details of its event-detection, its use of triangulation to locate the event, its use of blended and bonded communications channels, and its use of simultaneous transmission of electrical power and data over the same conductors in a tether.

Data Communications

The system is distinguished from the parent application and from the prior art by its use of a plurality of blended and bonded communications channels to transmit its video imagery to it users. A plurality of communications channels, 112, 114, and 116 connect the components of the system to each other and to a Remote Media Fusion Unit, comprising a monitoring station, a broadcast studio and its associated transmitter or Internet server remote from the target event 1702. The user of the system may rely on third-party providers for some of these the communications channels. In some cases, the user subscribes to channels, as with cellular service providers. In other cases, the user may arrange its own frequencies and licenses, as with satellite link, microwave link, broadband wireless, control link and video downlink connections.

The fourth functional module is configured for multiplexed data communication. It comprises a dispatcher and a gatherer linked by a plurality of communications channels, wherein the dispatcher packetizes video streams and distributes them across the plurality of communications channels, and the gatherer reassembles the video streams at a destination.

The communications channels terminate at the Remote Media Fusion Unit (RMFU) 1702 which may contain a studio; a broadcast, terrestrial wired, or satellite transmitter site; or at an Internet server site.

The integrated arrangement comprises a dispatcher and a gatherer, linked by a plurality of communications channels, that packetize video streams and distribute them efficiently over the plurality of communications channels and to reassemble the video streams at a destination proximate to a monitoring station, a television transmitter, and an Internet server.

The functions of the video processing subsystem 312 and wireless communications subsystem 314 are depicted in FIG. 10 alongside the Open Systems Interconnection (OSI) stack 1032, with which it correlates. The VCL(H.264/H.265) 1001, corresponds to the application layer (7) 1018 layer; The NAL(H.264/H.265) 1002 corresponds to the presentation layer (6) 1020 layer; the dispatcher algorithms 1004 correspond to the session layer (5) 1022; the user datagram protocol/real time protocol UDP/RTP 1006 chunking corresponds to the transport layer (4) 1024; the IP 1008 packetizing corresponds to the network layer (3) 1026; framing the data links 1010 corresponds to the data link layer (2) 1028; and the connection to a transmitter/Internet server 1012 corresponds to the physical layer (1) 1030.

The hardware and software acquire a video signal from the cameras, compress it according to a standard, such as H.264 or H.265, depending on the embodiment, chunk it according to the network abstraction layer (NAL) algorithms, assign a sequence number to each chunk, transmit the chunk to the dispatcher, which dispatches it to a wireless channel, and records sequence number and channel.

Figure 11:
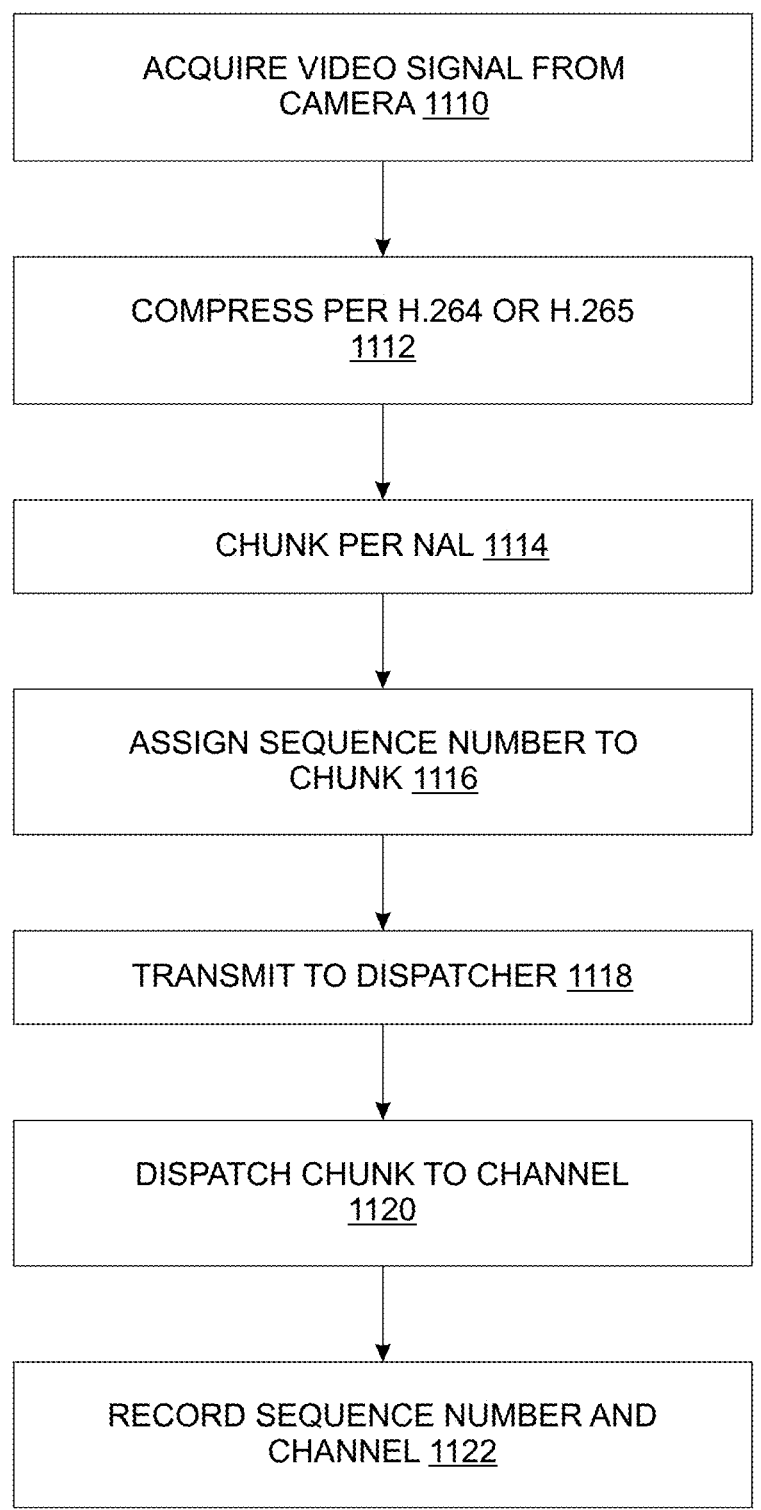
FIG. 11 is a flowchart showing how the dispatcher chunks the data stream from the camera downlink and assigns sequence numbers to the chunks.

FIG. 11 depicts the steps performed by the video processing subsystem 312 and the wireless communications subsystem 314. The system acquires a video signal from a camera 1110, compresses the data in the signal according to the H.264 or H.265 protocol 1112, chunks it according to the NAL standard 1114, assigns a sequence number to chunk 1116, transmits it to the dispatcher 1118, which processes it and sends to a wireless channel 1120, and records the sequence number and channel 1122.

The dispatcher 110 comprises hardware and computer program code that distributes the video stream from the camera across a plurality of communication channels for optimal load balancing.

Frequency division multiplexing is a term frequently used when a signal is divided among a plurality of frequencies, each on a different medium. A more proper term is space division multiplexing, with frequency division multiplexing reserved for division among a plurality of frequencies on the same medium. So the allocation of the video signal among multiple channels in the present disclosure is space division multiplexing and is referred to as such.

The dispatcher 110 uses predictive algorithms based on non-delivered chunks of data to monitor communication channel capacity and preemptively adjusts video transmission rates to minimize latency. Its computer program code assigns video data chunks to the communication channels using flow control and sequencing algorithms to ensure correct chunk order and data integrity across variable network conditions, records the communications channel to which it assigns each chunk and uses machine learning to predict network conditions and adjust transmission rates for each communication channel based on real-time feedback.

The dispatcher 110 comprises transmitters connected to antennas for each uplink channel.

Figure 12:
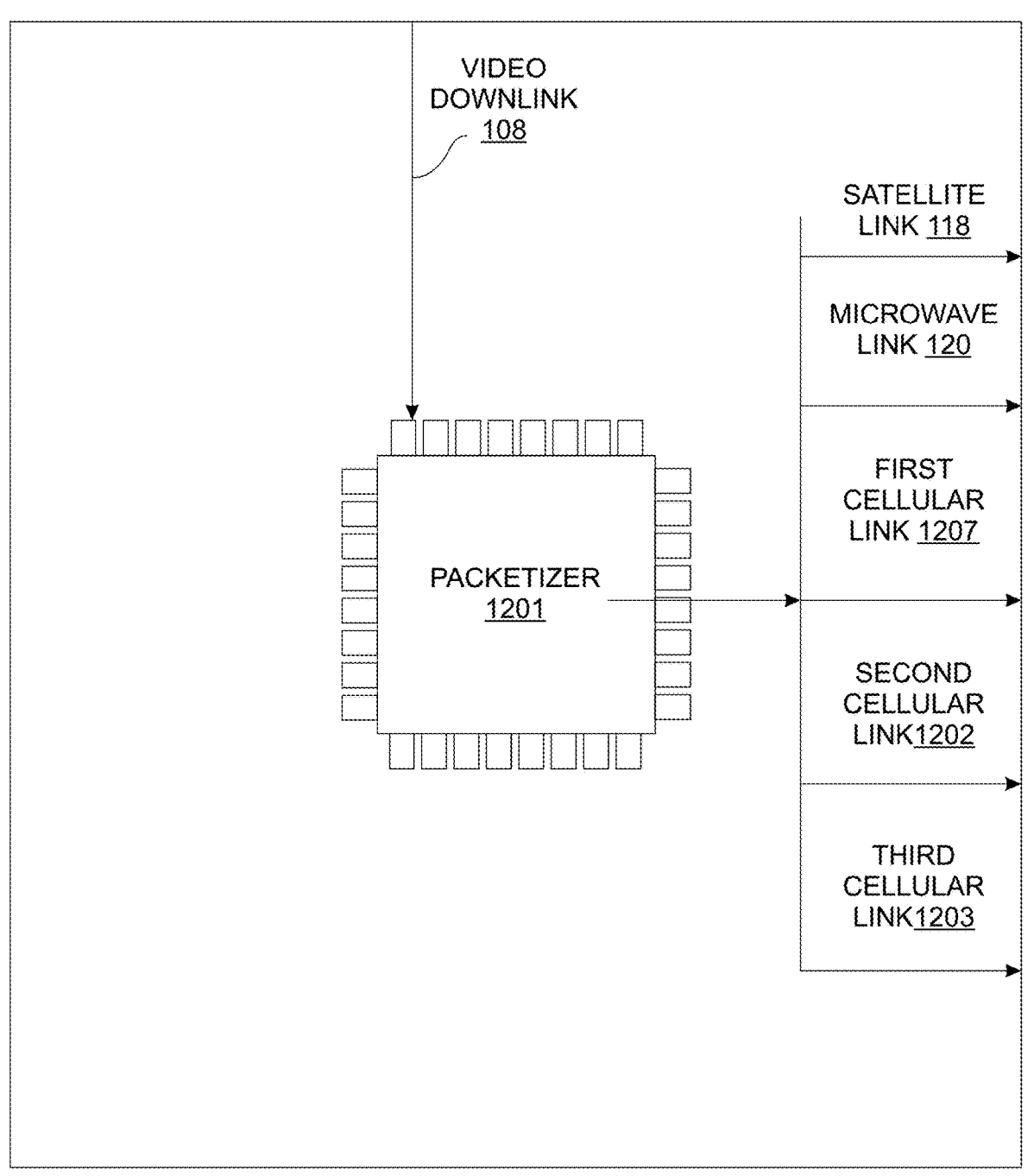
FIG. 12 depicts the dispatcher, showing the connections among its packetizer, the camera downlink, and the wireless uplink channels.

The packetizer 1201 comprises a computer, and computer program code that perform the digital processing to assign the full motion video stream from the vehicle's camera to a plurality of uplink channels: a satellite link 118, a microwave link 120, cellular links 118, shown on FIG. 12 as first cellular link 1207, second cellular link 1202, and third cellular link 1203.

In some embodiments the dispatcher is a ground-based unit, integral to the mission 128, linked to the drone via a video downlink 1204. In other embodiments, the dispatcher is aboard the drone, integral to its wireless communications subsystem 314 components.

FIG. 12 depicts the connections inside the dispatcher 110, which comprise a packetizer 1201, a first cellular link 1207, a second cellular link 1202, a third cellular link 1203, a video downlink 108, a satellite link 118, and a microwave link 120.

As a component of the dispatcher, the packetizer is responsible for dissecting the video stream received from the cameras into frames, packets, and other groups of bits appropriate for insertion into different channels. In other words it performs the functions enabling frequency division multiplexing, with each channel representing a frequency, in that context.

The packetizer performs network abstraction layer (NAL) processing on the downloaded image data, fragmenting the image data frames to the maximum transmission unit (MTU) of the lower layers in the OSI stack 1032-1370 bytes, in one embodiment. The packetizer 1201 ensures that the chunk size does not exceed the MTU of any lower layer. Ensuring that the size of the NAL unit passed down to the lower layers does not exceed the MTU of any of those lower layers eliminates the possibility of further fragmentation at lower-layer processing and permits the NAL units to be distributed to the respective communication channels intact.

The dispatcher also performs functions beyond the scope of the packetizer relating to efficient allocation of information among the channels, detection of packet loss, and throttling of channels.

Figure 13:
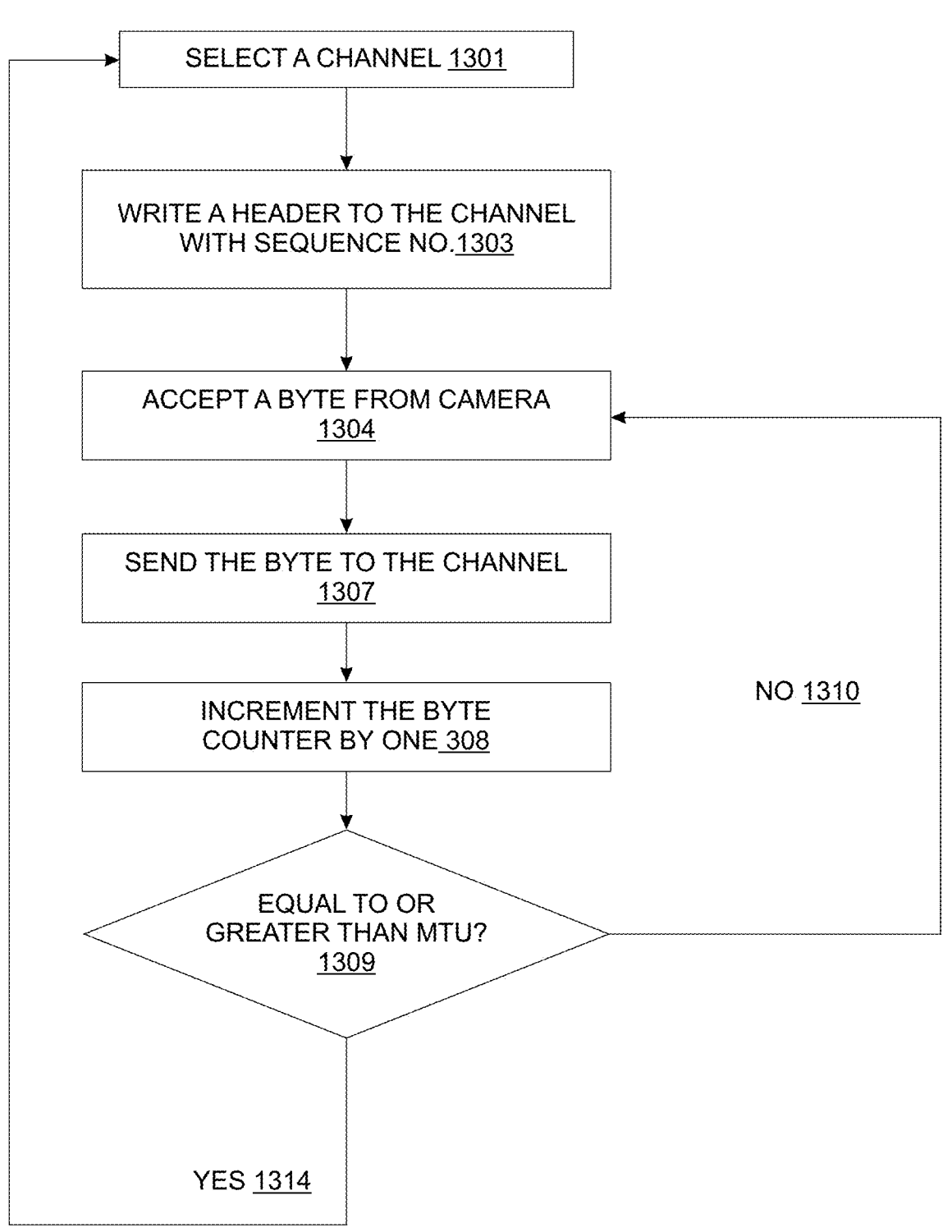
FIG. 13 is a flow chart depicting the chunking process in the dispatcher.

FIG. 13 depicts one aspect of the dispatcher 110 operation The dispatcher selects a wireless channel 1301, writes a header to the channel with a sequence number for the next chunk of data 1303, accepts a byte of data from the camera through the video downlink 1304, sends the byte to the output channel 1307, increments a byte counter by one 1308, and tests whether the resulting value of the byte counter is equal to or greater than the maximum transmission unit (MTU) 1309. If it is not 1310 the dispatcher repeats the process, accepting another byte from the camera downlink 1304.

Attaching sequence numbers to each chunk permits the gatherer to reassemble the in proper order even though they arrive at the gatherer at different times, based on different channel performance.

If the byte counter is greater than the MTU 1314, the dispatcher selects a channel 1301 (which may be the same channel or a different one) and repeats the process.

Figure 14:
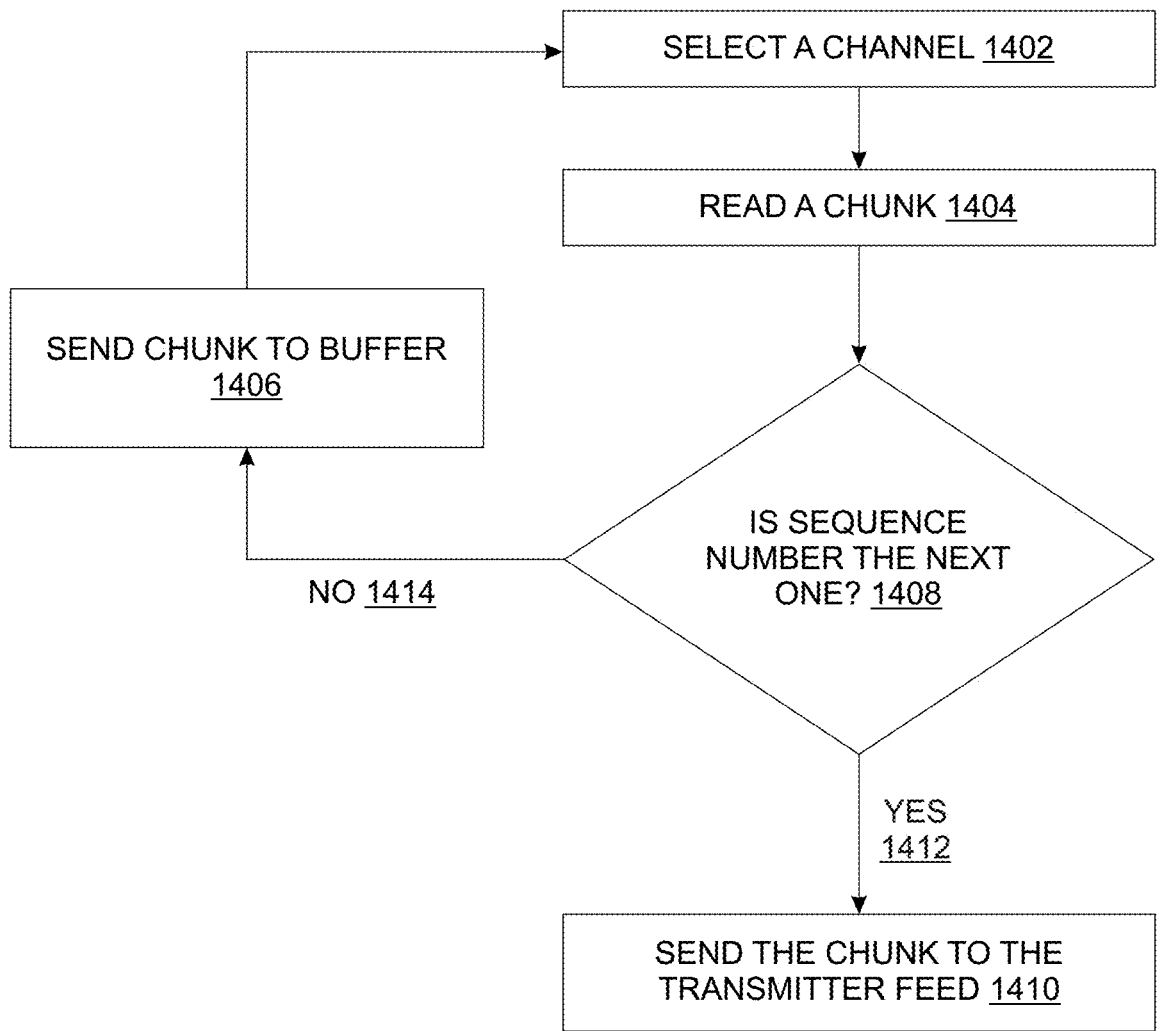
FIG. 14 is a flowchart showing how the bundler in the gatherer receives the chunks from the various wireless links and reassembles them in order.

The dispatcher provides a buffer to contain data downlinked from the camera until it can be processed and buffers to contain data directed to an output channel until the output channel can accept it. FIG. 14 shows one aspect of the buffering process. The dispatcher 110 selects a channel 1402, reads a chunk 1404, and determines if the sequence number is the next one 1408. If it is the next number in sequence 1412, it sends the chunk to the transmitter feed 1410. If it is not, it buffers the chunk. 1406, selects a channel 1402 (which may be the same or a different one) and repeats the process.

The result of this process is to fragment the much larger units of data represented by an entire video frame from the camera downlink into chunks no greater than can be handled by the MTUs of the lower layers in the OSI stack preparing them for transmission on the output channels.

The sequence numbers in the chunk headers permit the smaller chunks of information to be reassembled by the gatherer 1704 in the correct order after they have been fragmented ensuring that the chunks created by this process are no larger in size than the smallest MTU acceptable by lower layers in the OSI stack. Such sizing of the chunks by the dispatcher ensures that no further fragmentation will occur, which might result in loss of sequencing. The dispatcher module distributes the packets among the available channels, which may be as limited as two conventional cellular channels or as numerous as a dozen or more cellular channels, Wi-Fi channels, proprietary video channels, microwave channels, and satellite channels. Until it learns more about channel capacity, the distributor module feeds the packets into each channel sequentially so that the data rate of packets entering each channel is the same.

The flows of NAL units and their corresponding quick UDP Internet connections (QUIC/UDP) segments and IP packets are separated into streams and inserted into communications channels, one stream per channel, but the sequence of NAL units in a particular stream is not a continuous portion of the higher level video sequence. Rather, the NAL units comprising the higher level sequence are distributed across multiple streams and channels according to channel capacity and performance.

The dispatcher software uses UDP (User Datagram Protocol) or optionally QUIC or RTP protocols combined with NAL application-layer flow control and sequencing techniques to manage the video streams. The dispatcher application program code handles packet reordering and flow management, providing greater flexibility for adapting to the variable conditions of cellular networks. The dispatcher paces the sending of packets into each stream based on input from the gatherer to enable the dispatcher's role as a congestion controller.

To perform its function effectively, the dispatcher discovers bit rate, latency, and error rate for each channel. Latency discovery is straightforward by means of the Internet ping command. Discovery of bit rate and error rate occurs through the interaction between the dispatcher 110 and the gatherer 1704.

The flow control and sequencing algorithms balance speed and reliability. Flow control continuously adapts to the real-time state of each cellular connection, while sequencing mechanisms ensure that data is delivered in the correct order despite packet loss or out-of-order arrival. The dispatcher uses machine learning and predictive algorithms to monitor network conditions and to adjust flow control and sequencing parameters preemptively to minimize latency and maximize throughput.

One embodiment achieves inter-stream sequencing by defining a protocol that tags data, such as NAL chunks with identifiers specifying which part of a larger message they belong to, regardless of the stream that carries them. The receiver buffers out-of-order chunks and reorders them based on the protocol's rules before further processing. This aspect of the design overcomes a deficiency in the QUIC protocol, which ensures correct intrastream sequencing but not correct interstream sequencing, important for bonded cellular and blended transmission of real time audio and video.

The dispatcher's advanced flow control for blended networks relies on AI (artificial intelligence) algorithms that predict the behavior of each link based on historical data. These algorithms adjust transmission rates, buffer sizes, and sequencing strategies in real-time, optimizing performance based on current network conditions.

The gatherer, as part of the RMFU 1702, undoes what the packetizer did, reassembling discrete packets, frames, and other groups of bits into streams compatible with the needs of the monitor, transmitter or Internet server. It also coordinates with the dispatcher to buffer information and to identify lost packets.

Figure 15:
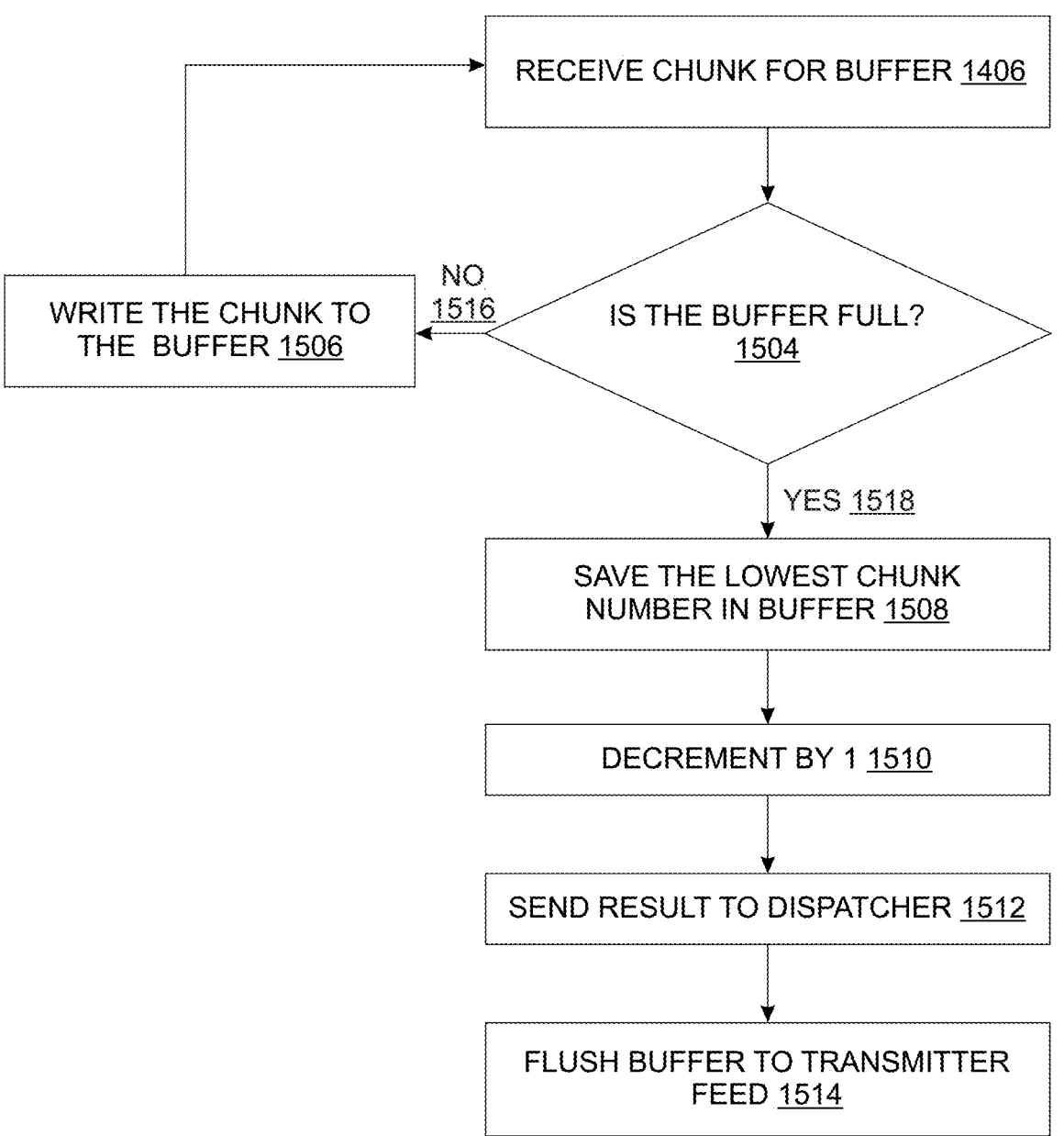
FIG. 15 is a flow chart depicting management of the gatherer's buffer.

FIG. 15 illustrates the process for flushing the buffer. A new chunk is received for the buffer 1406. The routine tests whether the buffer is full 1504. If is not 1516, the chunk is written to the buffer 1506 and another chunk is received 1406. If the buffer is full 1518, the lowest chunk number is saved in the buffer 1508, the chunk number is decremented by 1 1510, the result is sent to the dispatcher 1512, and the buffer is flushed to the transmitter feed 1514.

When the gatherer detects a missing a chunk and therefore sends later chunks to its buffer, the logic saves the number for the lowest numbered chunk in the buffer. This is the first chunk to arrive after the missing one. By decrementing the chunk's number by one, the logic obtains the number of the missing chunk, and sends that number to the dispatcher 1512. The gatherer then flushes the buffer to the transmitter feed 1514.

Figure 16:
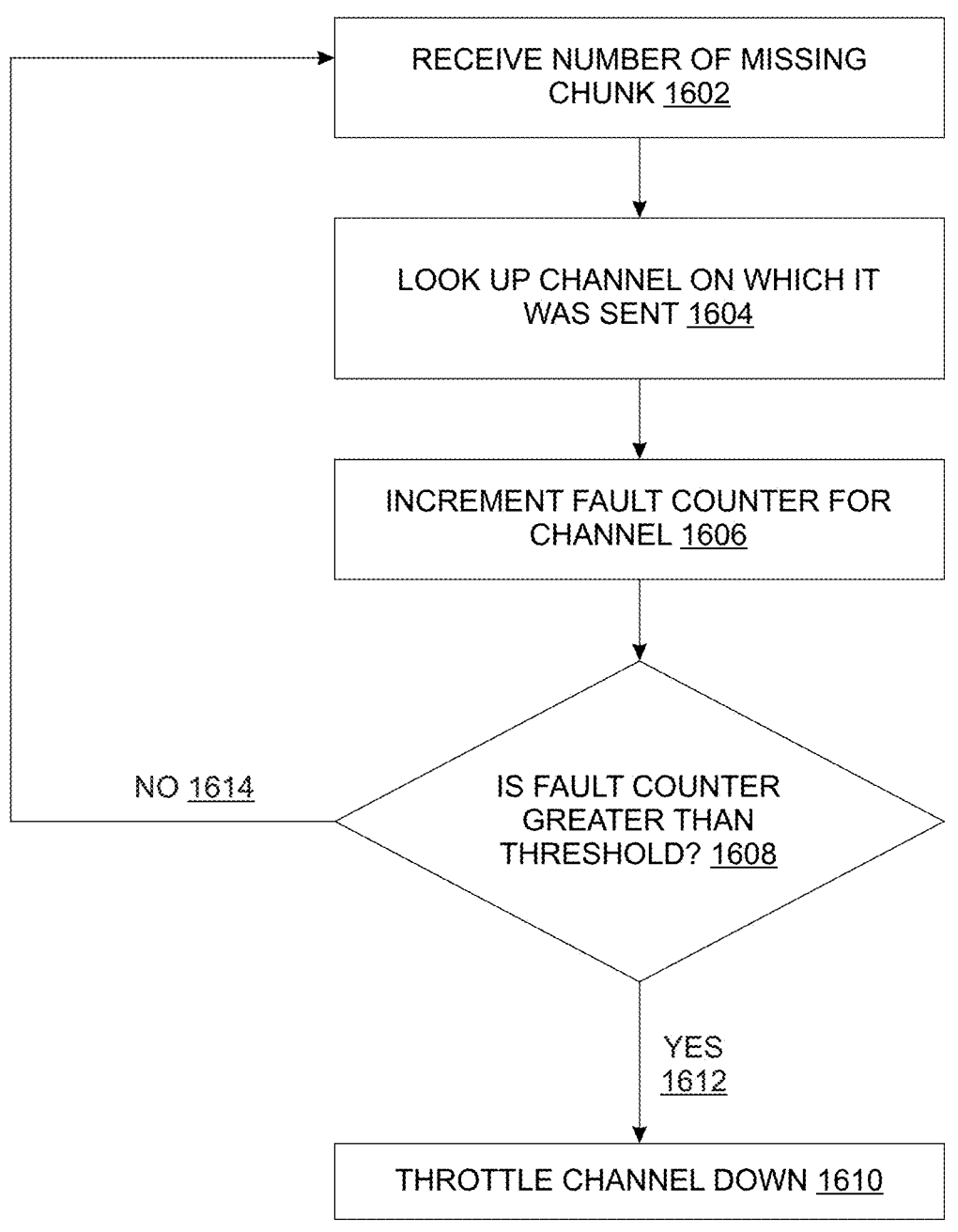
FIG. 16 is a flowchart depicting the logic in the dispatcher that adjusts the flow to different channels according to information received from the gatherer about channel performance.

FIG. 16 depicts the logic for adapting to channel capacity. The number of a missing chunk is received 1602, and the channel on which it was sent looked up 1604. The fault counter for that channel is incremented 1606. If the fault counter then is greater than a pre-determined threshold 1608, 1612, the channel is throttled down 1610. If the counter is less than the threshold 1614, the number of another missing chunk is received 1602, and process is repeated.

The gatherer 1704 is part of a Remote Media Fusion Unit (RMFU) 1702, located proximate to the user of the system.

Figure 17:
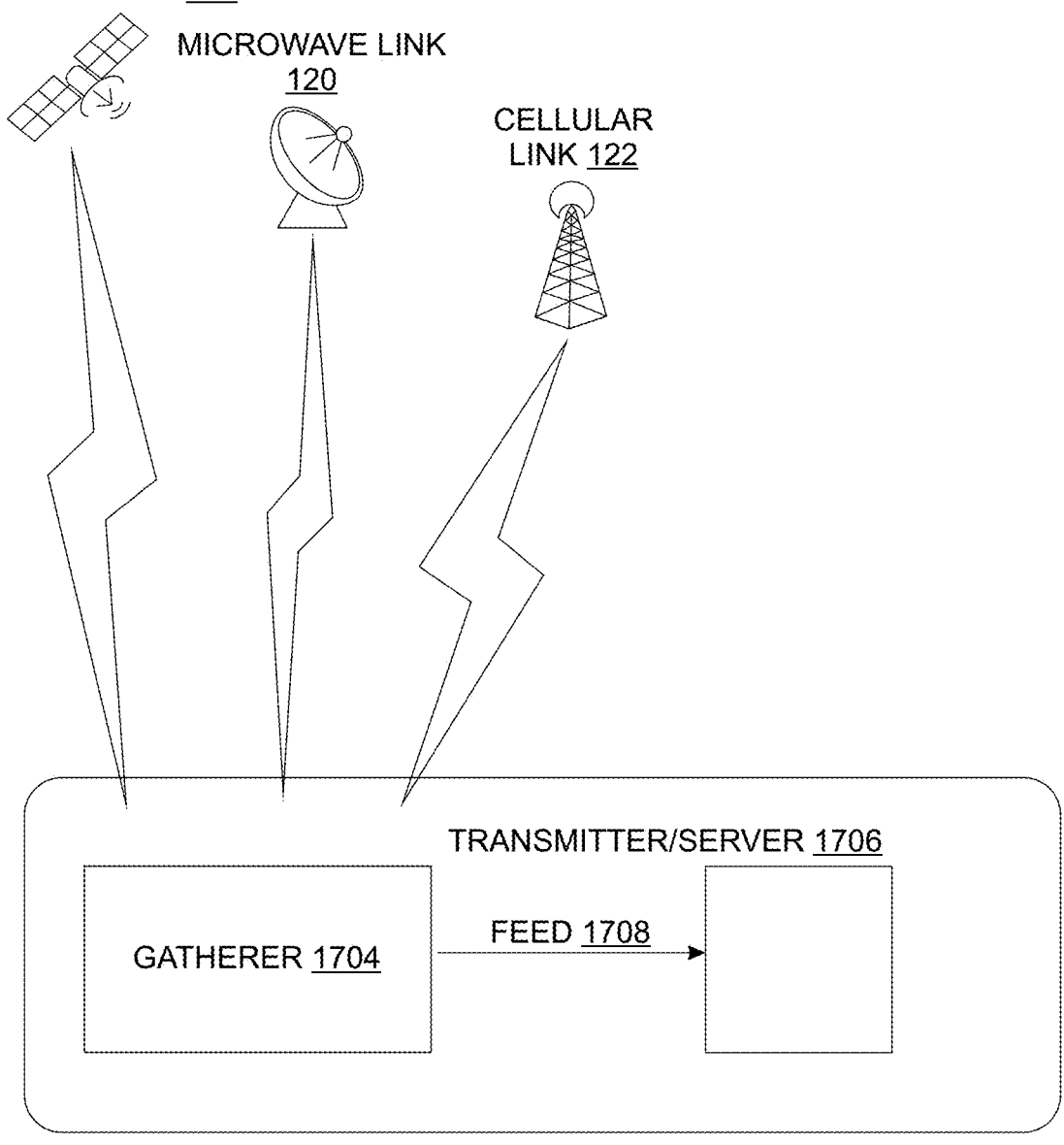
FIG. 17 depicts the gatherer and its relationship with the wireless channel downlinks and the broadcast transmitter or Internet server.
Figure 18:
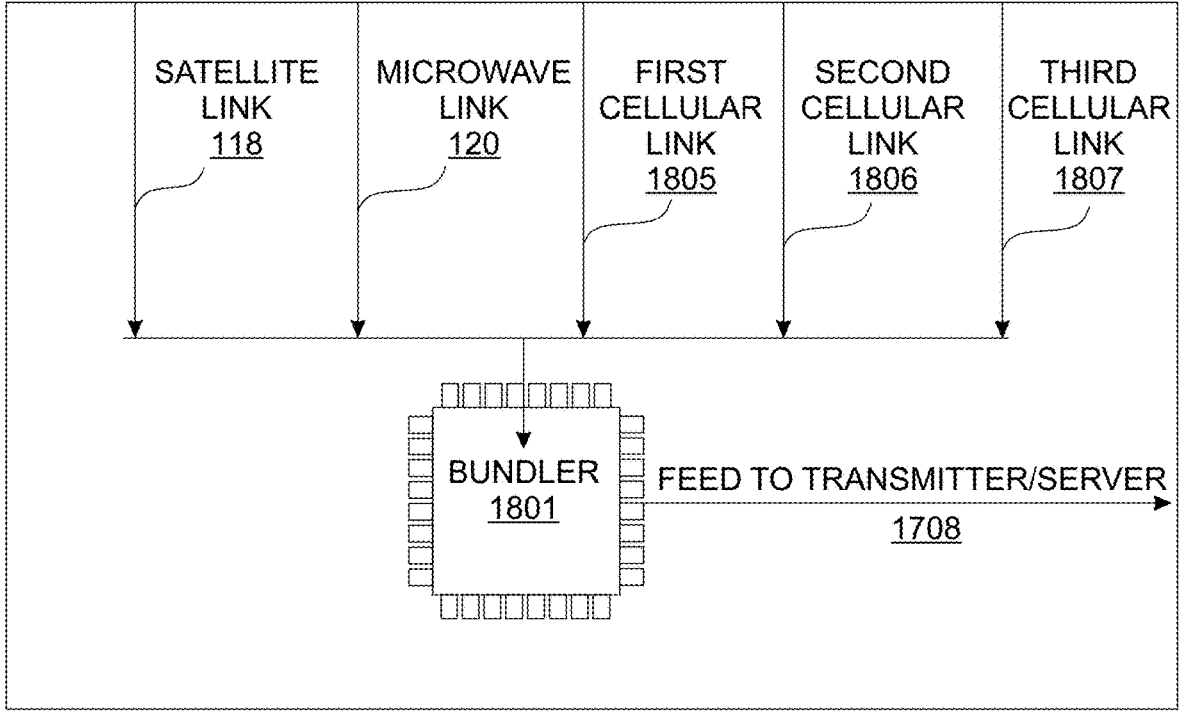
FIG. 18 shows the components of the gatherer, including its bundler and its connections to the wireless channel downlinks and the transmitter feed.
Figure 19:
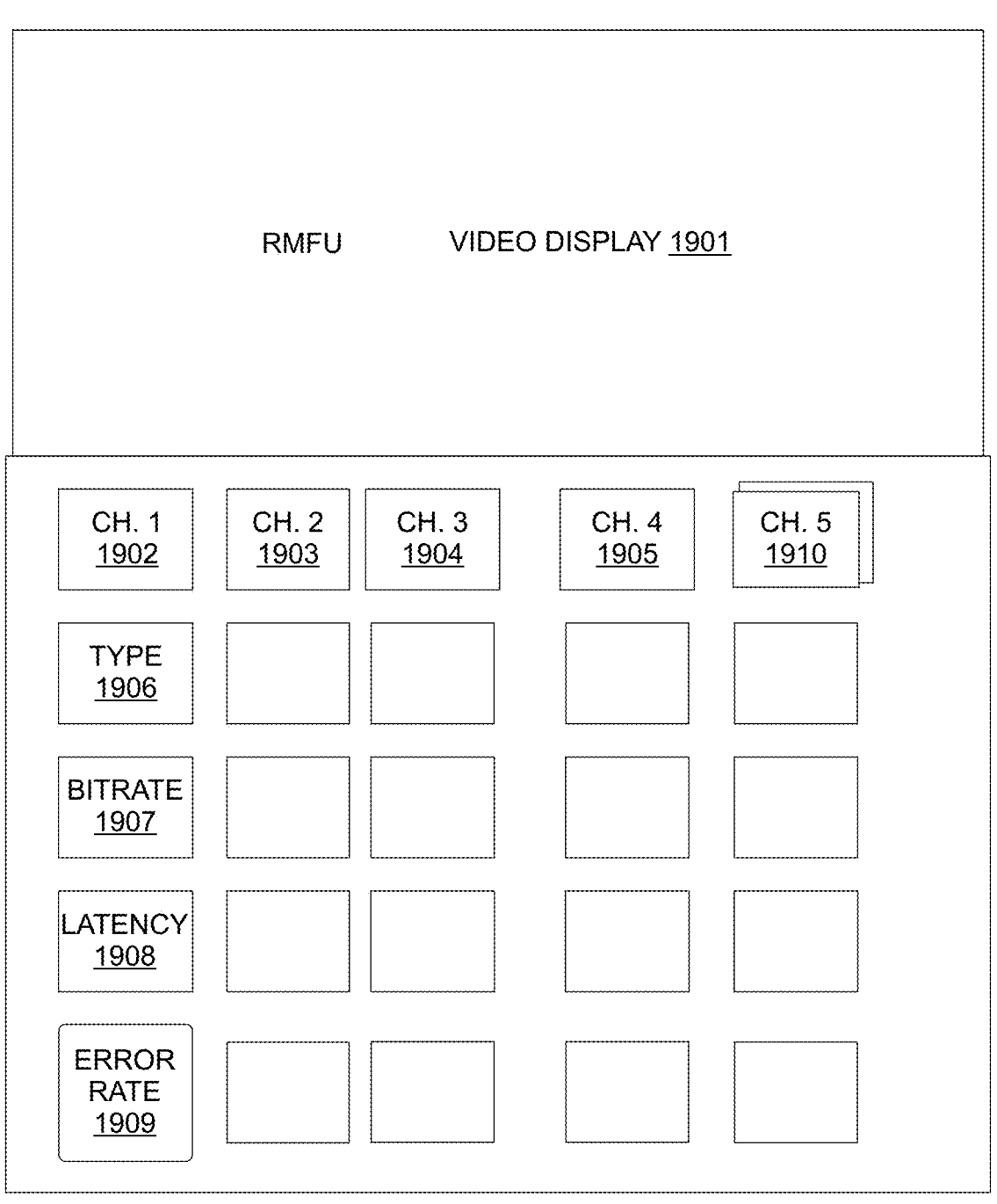
FIG. 19 depicts the user interface of the RMFU.

The basic function of the gatherer 1701 is depicted in FIG. 17. The gatherer reassembles packets and frames from the plurality of channels comprising one or more satellite links 118, microwave links 120, and cellular links 122, delivers the recombined signal through a feed 1708 to the transmitter or Internet server 1706. [Intentionally blank].

The gatherer 1701 comprises a bundler 1801, a plurality of satellite links 118, microwave links 120, and cellular links—first cellular link 1207, second cellular link 1202, and third cellular link 1203, a feed to transmitter/server 1808.

The RMFU comprises a video display 1901, which presents a matrix displaying channel numbers 1902, 1903, 1904, 1905, and 1910 a type of channel 1906, a bit rate 1907, a latency 1908, and an error rate 1909.

In an alternative embodiment, the video display can be located proximate to the dispatcher.

Continuity of Electrical Power

The present disclosure modifies a basic drone available in the market to enable it to remain aloft beyond the normal exhaustion of batteries provided with the drone. Several different embodiments address this goal of increasing flight endurance. This application enhances the disclosure in the parent application by providing additional detail as to the structure and functioning of those different enablements, including use of a ground-based battery replacement station and a tether capable of carrying both electrical power and data signals on the same pair of conductors.

The fifth functional module is configured for flight endurance despite limited battery charge. It comprises a power management system configured to extend drone operation beyond onboard battery capacity through external power supply. The power management system comprises a battery replacement system including an onboard battery monitoring system, a power manager, and an automated battery replacement station.

The drone comprises an onboard battery monitoring system that monitors drone battery levels, signals a power manager when the battery level reaches a pre-determined threshold based on distance from a battery replacement station to the target event, and directs the drone to the battery replacement station.

Figure 20:
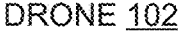
FIG. 20 shows the interaction of the drone, the battery replacement station and the power manager

FIG. 20 depicts the ground-based battery-replacement enablement. It shows an embodiment with a battery replacement station 2002, which can receive a drone 102 flying for a battery replacement 1208. When a vehicle detects that its battery level has reached a pre-determined threshold-below 15% in one embodiment, it sends a message to the power manager 2001. The message causes the power manager to command the vehicle to leave formation and go to battery replacement station 2002. The battery replacement station 2002 extracts the low battery and connects to charging apparatus and installs fully charged battery, without human intervention. The battery replacement station 2002 comprises the necessary racks and mechanisms to hold the drone, to remove its depleted battery and connect to a changing device, to remove a fully charged battery from its charger, to install it in the drone, and to release the vehicle for flight.

The battery replacement apparatus automatically detects the arrival of the drone at the landing zone, performs the battery replacement process without human intervention comprising: removal of a depleted battery, insertion of a fully charged battery into the drone and includes an drone recognition and battery handling alignment mechanism specific to the drone's physical battery interface.

In one embodiment, a second drone called the relief vehicle 2003 is provided. As soon as the first drone 102 sends a battery exhaustion message through the battery exhaustion dialogue 1206 to the power manager 2001, the power manager 2001 transmits a message through the relief vehicle dialogue 2004 to the relief vehicle 2003, launching it and causing it to take up the position now vacated by the first vehicle. Availability of a relief vehicle 2003 means that coverage of the triggering event is continuous, even while drones are obtaining battery replacements.

The battery replacement station 2002 is a commercially available off-the-shelf automatic-landing-zone, battery-charger and battery-replacement system capable of directing a vehicle to dock in the proper place on the automatic landing zone, after which it removes the nearly depleted battery and places it on the charging apparatus. The apparatus inserts a fully charged battery into the vehicle. After the charging station completes those operations, it signals the power manager 2001, and the power manager gives a signal to the vehicle, which now has a fully charged battery, authorizing it to return to its position for monitoring the target event 104. Upon receiving that signal from the power manager, the vehicle returns to a position proximate to the target event.

The source of electrical power is adequate to handle the total number of batteries. One embodiment provides three square feet of solar panel area.

The charging station is powered by solar panels of appropriate size, three square feet in area in one embodiment. An auxiliary gasoline or diesel engine backs up the solar power in one embodiment. Fixed batteries in the charging station serve as a buffer and storage medium between the electrical source and the vehicle-battery charging apparatus.

Figure 21:
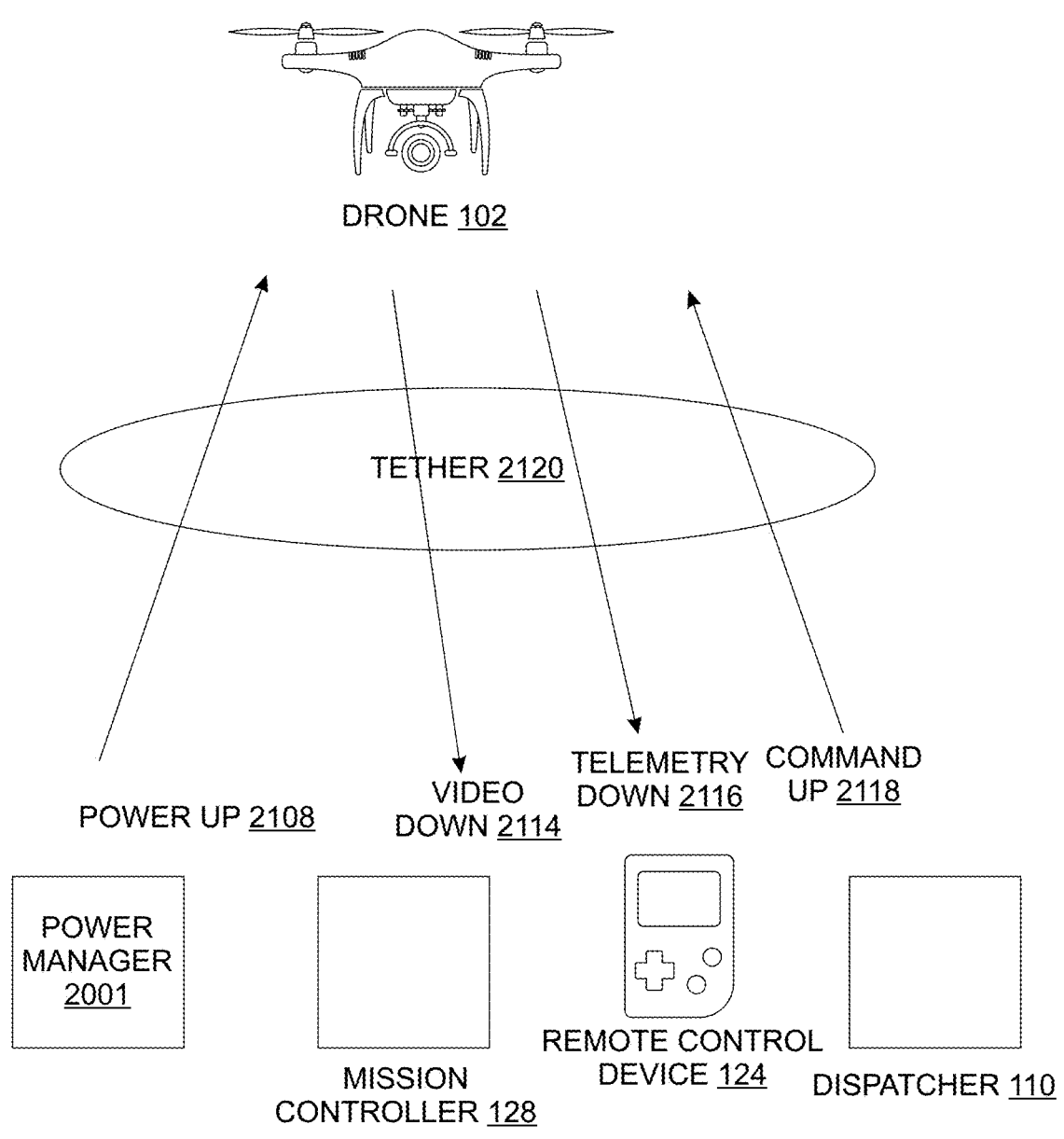
FIG. 21 shows how electric power is supplied to the drone via a tether.

In an alternative embodiment, shown in FIG. 21, the power management system comprises a tether comprising conductors for providing continuous electrical power to the drone.

the drone 102 can remain aloft, covering the target event 104, as long as the event persists. In this embodiment, the drone 102 does not have to land to receive a charged battery. It receives a continuous supply of electricity through a power up 2108 conductor to the drone 102, contained in a tether 2120 from the power manager 2001. The tether 2120 also carries telemetry 2116 down from the drone to the mission controller 128 and the dispatcher 110 and commands from the remote control device 124 and the mission controller 128 to the drone through the tether. All signals travel on a plurality of conductors enclosed by the tether.

The tether comprises an electrical power conductor and a digital communications conductor capable of carrying video, telemetry, and command information to enable continuous operation of the drone without battery constraints.

Figure 22:
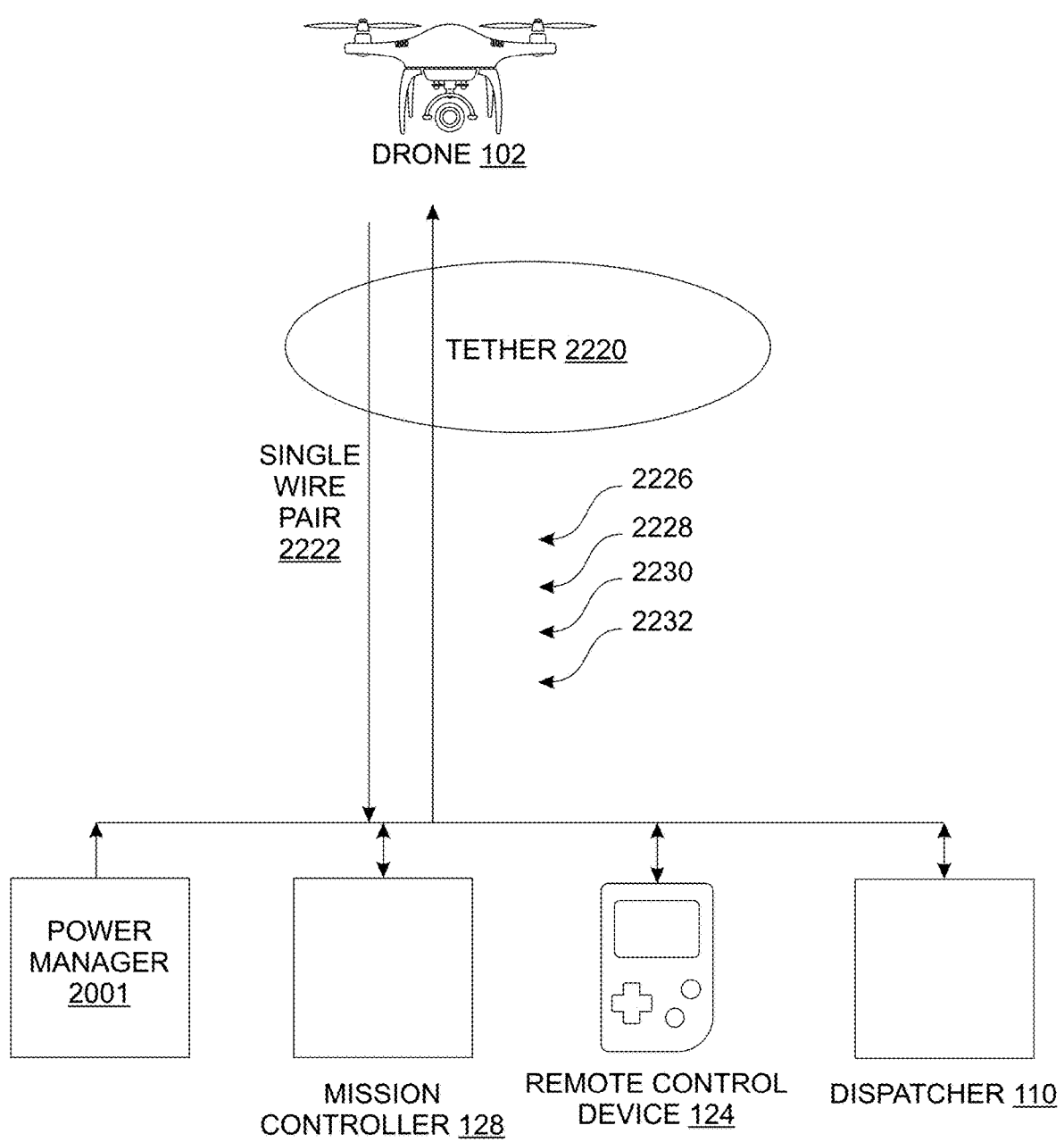
FIG. 22 illustrates how both electrical power and data communications can be provided to the drone via a single pair of conductors in a tether.

In an alternative embodiment, shown in FIG. 22, the power management system comprises a tether comprising a single pair of conductors for providing continuous electrical power to the drone simultaneously with allowing data communications to and from the drone The drone 102 is connected through a tether 2220 enclosing a single wire pair 2222. The single wire pair 2222 carries electrical power up 2226, video down 2228, telemetry down 2230, and commands up 2232 to and from the power manager 2001, the mission controller 128, the remote control device 124, and the dispatcher 110, with the signals and currents separated by appropriate LC filters.

In this embodiment the tether comprises only two conductors capable of carrying both electrical power and digital video, telemetry, and command information simultaneously with the electrical power to enable continuous operation of the drone without battery constraints, and to lessen the weight of the tether, compared to a tether with more than a single pair of conductors.

Remote Control of the System

The system is subject to varying degrees of remote control. Its autonomous operations are controlled in part by commands sent by the mission controller 128, as determined by the program code distributed between the drone and the mission controller. Manual operations are controlled by a remote control device 124 operated by human user proximate to the drone.

The sixth functional module is configured for modified parameters by remote control. It comprises a mission controller with interfaces for receiving inputs from remote consoles through Internet or cellular connections, wherein such inputs modify target event definitions, launch conditions, flight profiles, spatial coordinates, or camera presets.

The system also allows for remote control at greater, essentially arbitrary, distances by means of cellular or Internet connections. These connections may be implemented on a plurality of wired or wireless channels, including those depicted as being bonded and blended for carrying video from the system to a broadcast station or Internet server.

Figure 23:
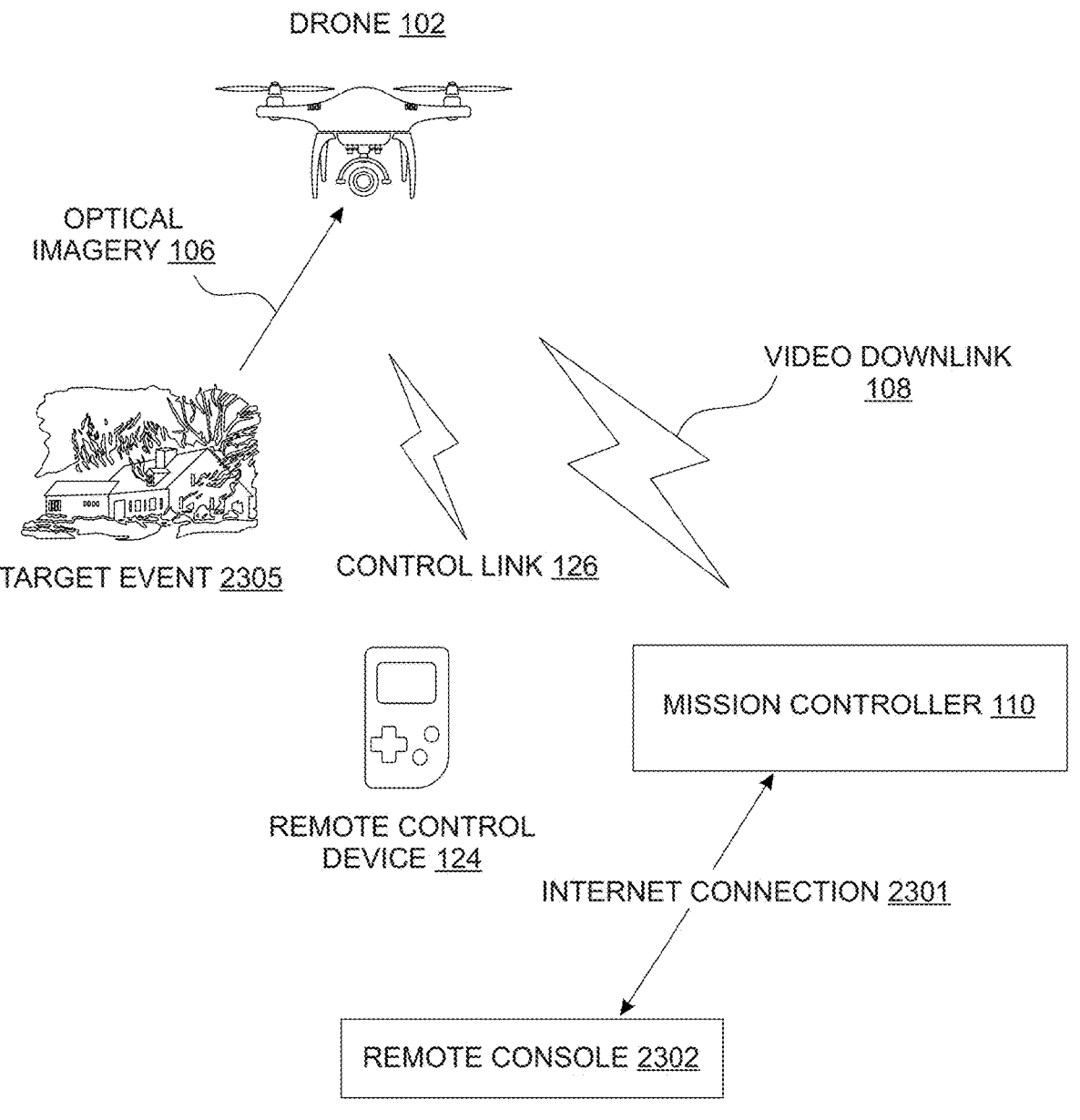
FIG. 23 shows how a human user exercises remote control of the system through an Internet connection.

FIG. 23 shows the signal paths for remote control of the system at a distance, through an Internet connection 2301. The mission controller 128 is connected to a remote console 2302 through an Internet connection 2301.

Figure 24:
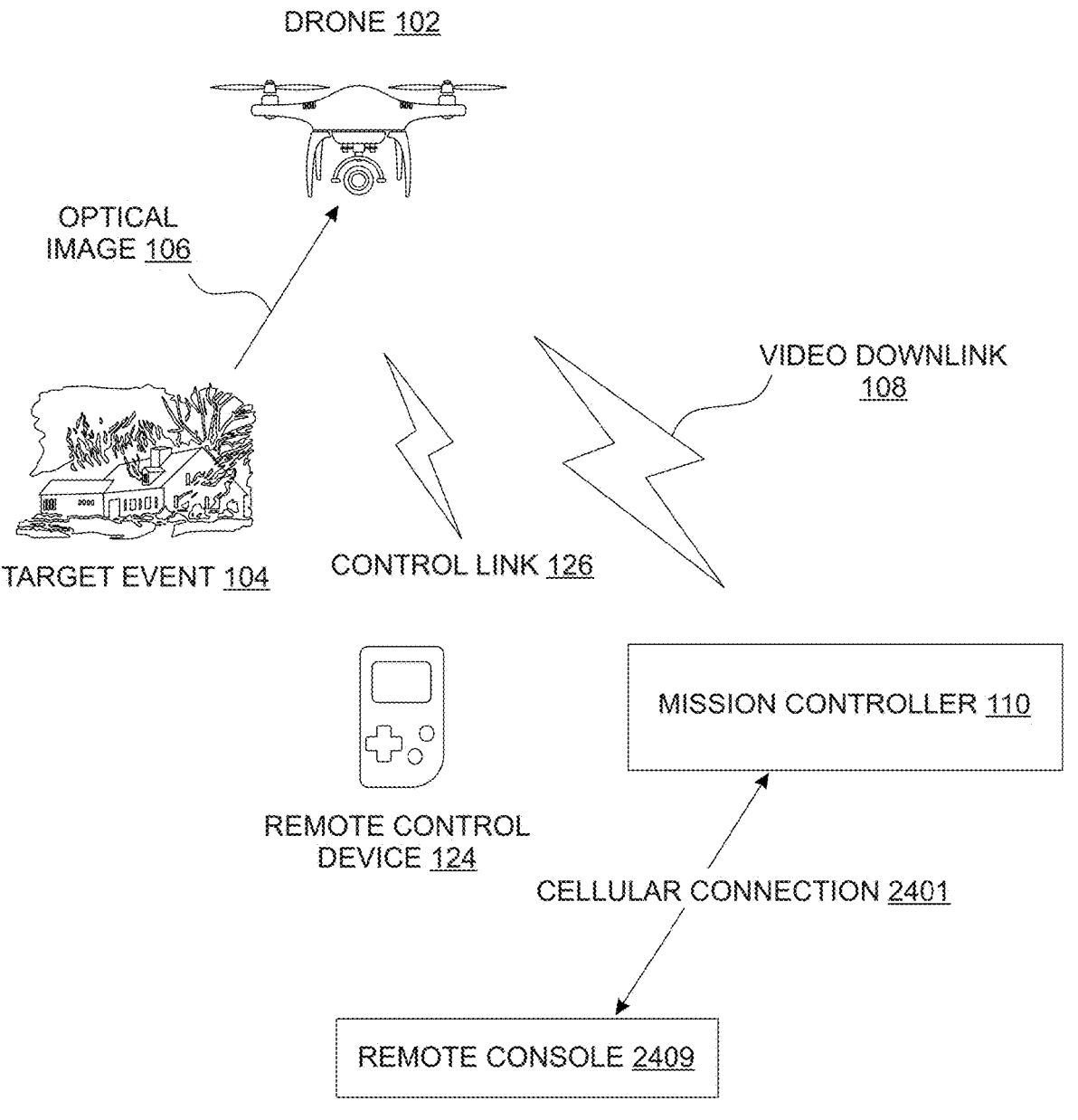
FIG. 24 shows how a human user exercises remote control of the system through a cellular connection.

FIG. 24 shows the signal paths for remote controls of the system at a distance, through a cellular connection 2401. The mission controllers 128 is connected to a remote console 2302 though a cellular connection 2401.

Regardless of whether the remote connection is effected through an Internet connection or a cellular connection, inputs from the remote console through the connection may comprise definition of target event, a modified launch condition, modified flight profiles, modified target coordinates, or modified camera presets.

Figure 25:
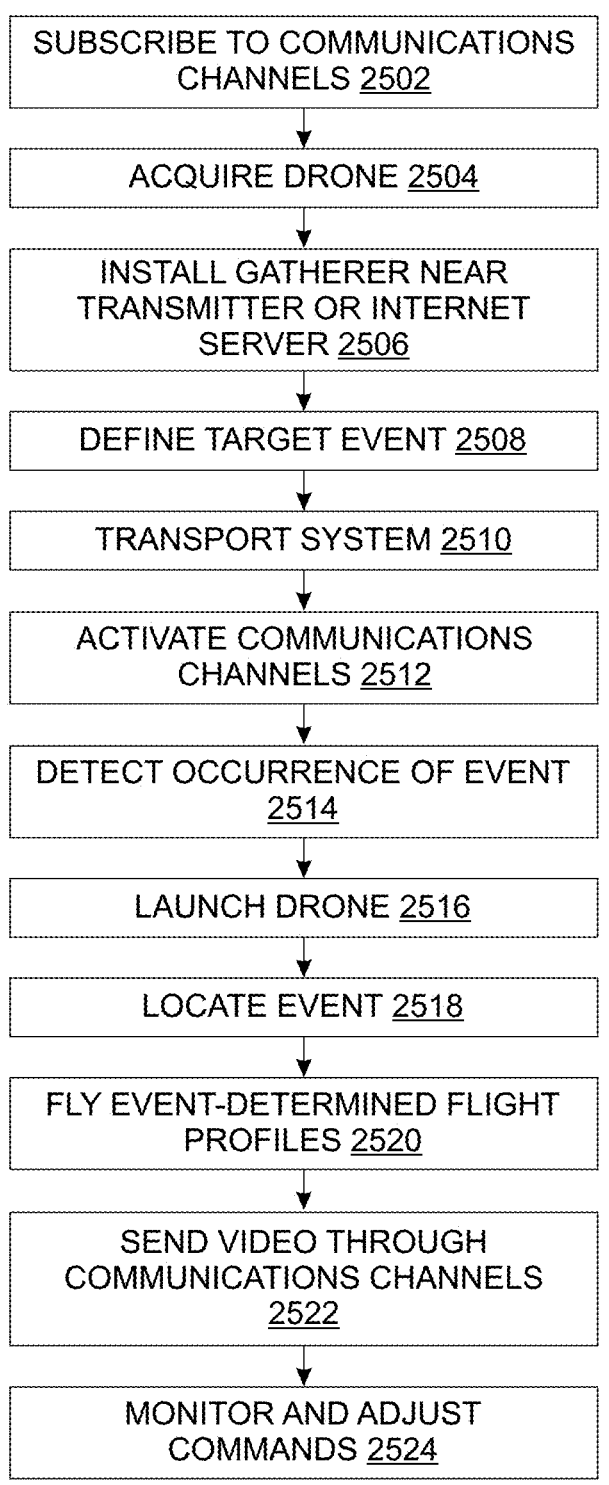
FIG. 25 is a flowchart depicting a method for using the system.

FIG. 25 depicts the method for using the system. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

The first steps are to subscribe to communications channels 2502, and to acquire a drone 2504 equipped with the system. Then a user installs the gatherer near a transmitter or Internet server 2506, and defines target event 2508, providing the system with appropriate sound, light, and vibration signatures associated with the event in the form of templates.

Then the user transports the system 2510 to a location proximate to where the event is expected to occur and activates the communications channels 2512.

The system detects occurrence of the event 2514 and launches the drone 2516.

Once the drone is launched the system locates the event 2518 and flies event-determined flight profiles 2520 autonomously.

As it flies the profiles, the dispatcher disaggregates the video into data units such as packets and frames and allocates units to each of the plurality of communications channels based on the characteristics of that channel, such as its bandwidth, latency, and error rate.

The system transmits video through the plurality of communications channels 2522.

The user monitors mission performance and video collected and and makes adjustments by sending commands 2524.

The dispatcher and gatherer cooperate to determine which of the plurality of communications channels is losing data units, based of a determination of which units do not arrive, and the dispatcher throttles that communications channel.

Distinguishing the Prior Art

While applications involving drones used in the property insurance context have disclosed somewhat similar features and methods, the differences in purpose undermine any obvious mapping of the insurance industry disclosures to the newsgathering and public safety context. Speed is of the essence newsgathering in public safety contacts, but not in the insurance context; the types of target events are substantively different, although they overlap to a limited degree; the insurance applications do not call for triangulation to determine the location of a target event.

Insurance applications do not disclose the features necessary for effective law enforcement, other first responder, and newsgathering applications. The insurance application focus on determining damage that might support claims, fraudulent claims, and infrastructure necessary to process claims. None of this is relevant to the law enforcement, other public responder, and newsgathering applications.

Disclaimer

The inventor does not claim the blended and bonded digital communications system and methods disclosed in U.S. Pat. No. 12,250,377, but only the combination of such system and method with the other features of the present disclosure.

I claim:

1. An autonomous aerial imagery system comprising six subsystems and six functional modules configured to work together, comprising:

a drone comprising a propulsion subsystem, a control subsystem, an electric power subsystem, a sensor subsystem, a video processing subsystem, and a wireless communications subsystem;

a first functional module configured for event detection by autonomously detecting occurrence of target events without human intervention;

a second functional module configured for event location using triangulation from multiple spatial positions;

a third functional module configured for autonomous profile flight based on detected event types;

a fourth functional module configured for multiplexed data communication across a plurality of wireless communications channels external to the drone;

a fifth functional module configured for flight endurance despite limited battery charge; and a sixth functional module configured for modified parameters by remote control, wherein the second functional module configured for event location comprises:

direction-finding components including at least four sensorpods mounted on respective rotor booms of the drone;

each sensorpod having an acoustic sensor and an optical sensor positioned at different spatial locations;

wherein the second functional module autonomously determines spatial coordinates of a target event by calculating latitude, longitude, and elevation through triangulation using multiple bearing measurements taken from the different spatial positions of the sensorpods.

2. An autonomous aerial imagery system comprising six subsystems and six functional modules configured to work together, comprising:

a drone comprising a propulsion subsystem, a control subsystem, an electric power subsystem, a sensor subsystem, a video processing subsystem, and a wireless communications subsystem;

a first functional module configured for event detection by autonomously detecting occurrence of target events without human intervention;

a second functional module configured for event location using triangulation from multiple spatial positions;

a third functional module configured for autonomous profile flight based on detected event types;

a fourth functional module configured for multiplexed data communication across a plurality of wireless communications channels external to the drone;

a fifth functional module configured for flight endurance despite limited battery charge; and a sixth functional module configured for modified parameters by remote control, wherein the fourth functional module configured for multiplexed data communication comprises:

a dispatcher and a gatherer linked by a plurality of wireless communications channels;

wherein the dispatcher packetizes video streams and distributes them across the plurality of communications channels, and the gatherer reassembles the video streams at a destination.

3. An autonomous aerial imagery system comprising six subsystems and six functional modules configured to work together, comprising:

a drone comprising a propulsion subsystem, a control subsystem, an electric power subsystem, a sensor subsystem, a video processing subsystem, and a wireless communications subsystem;

a first functional module configured for event detection by autonomously detecting occurrence of target events without human intervention;

a second functional module configured for event location using triangulation from multiple spatial positions;

a third functional module configured for autonomous profile flight based on detected event types;

a fourth functional module configured for multiplexed data communication across a plurality of wireless communications channels external to the drone;

a fifth functional module configured for flight endurance despite limited battery charge; and a sixth functional module configured for modified parameters by remote control, wherein the drone comprises at least four sensorpods at least one of which is attached to the distal end of each rotor boom, wherein each sensorpod comprises both an acoustic sensor and an optical sensor configured for directional sensing and triangulation.

4. A method for obtaining aerial video imagery of a target event upon detection of the target event comprising:

subscribing to a plurality of communications channels;

acquiring a drone;

modifying the drone with a system enabling the drone to:

detect the occurrence of the target event autonomously;

determine the location of the target event autonomously;

flying appropriate flight profiles relative to the target event autonomously;

transmit video through the plurality of communications channels; and maintain its source of electrical power;

installing a gatherer near a transmitter or Internet server;

defining the target event;

providing the system with appropriate sound, light, and vibration signatures associated with the target event in the form of templates;

providing the system with event-determined flight profiles definitions related to types of target events;

allowing the system to be transported to a location proximate to where the target event is expected to occur;

activating the plurality of communications channels;

autonomously detecting occurrence of the target event;

launching the drone autonomously;

locating the target event autonomously;

flying the event-determined flight profiles autonomously;

sending video through the plurality of communications channels;

allowing a user to monitor mission performance and video collected and to make adjustments by sending commands.

5. The method of claim 4, wherein sending the video through the plurality of communications channels comprises:

using a dispatcher connected to the gatherer through the plurality of communications channels;

chunking data streams received from a sensor subsystem into units suitable for allocating among the plurality of communications channels;

Event triggered drone system and method for image collection and transmission allocating such units to each of the plurality of communications channels based on its characteristics;

detecting units that do not arrive at the gatherer, throttling the particular communications channel of the plurality of communications channels on which that unit was sent.

* * * * *